(12) United States Patent
Masui

(10) Patent No.: US 9,019,620 B2
(45) Date of Patent: Apr. 28, 2015

(54) ZOOM LENS, IMAGE SENSING OPTICAL DEVICE AND DIGITAL APPLIANCE

(71) Applicant: Konica Minolta, Inc., Tokyo (JP)

(72) Inventor: Atsuo Masui, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/465,283

(22) Filed: Aug. 21, 2014

(65) Prior Publication Data

US 2015/0054989 A1  Feb. 26, 2015

(30) Foreign Application Priority Data

Aug. 22, 2013 (JP) ................................ 2013-172086

(51) Int. Cl.
  *G02B 15/14* (2006.01)
  *G02B 15/177* (2006.01)
  *G02B 9/34* (2006.01)

(52) U.S. Cl.
  CPC ................ *G02B 15/177* (2013.01); *G02B 9/34* (2013.01)

(58) Field of Classification Search
  CPC ...... G02B 15/177; G02B 15/14; G02B 13/04; G02B 27/646; G02B 13/18; G02B 13/009; G02B 15/16
  USPC .................................. 359/680–682, 683, 689
  See application file for complete search history.

(56) References Cited

U.S. PATENT DOCUMENTS

| | | | |
|---|---|---|---|
| 8,587,876 B2 | 11/2013 | Katayose et al. | |
| 2006/0056054 A1* | 3/2006 | Kashiki | 359/689 |
| 2007/0053069 A1 | 3/2007 | Yagyu et al. | |
| 2012/0257285 A1 | 10/2012 | Kuzuhara et al. | |

FOREIGN PATENT DOCUMENTS

| | | |
|---|---|---|
| JP | 2009-47982 A | 3/2009 |
| JP | 2009-271165 A | 11/2009 |
| JP | 2012-108279 A | 6/2012 |

OTHER PUBLICATIONS

Extended European Search Report for corresponding Application No. 14181589.4, dated Dec. 8, 2014 (7 pages).

* cited by examiner

*Primary Examiner* — Scott J Sugarman
(74) *Attorney, Agent, or Firm* — Brinks Gilson & Lione

(57) ABSTRACT

In a zoom lens, at least a first group of negative optical power and a second group of positive optical power are included from an object side, when zooming is performed from a wide-angle end to a telephoto end, a distance between the first and the second groups is reduced and an aperture is moved together with the second group. The first group is formed with a front group composed of only negative lenses and a rear group which is composed of two lenses, a positive and a negative from the object side and which has a positive optical power as a whole and the zoom lens satisfies a conditional formula: $0.06<T1/Lmax<0.11$ (T1 is a distance on an optical axis between the front and rear groups, and Lmax is the maximum total length of the zoom lens in zooming).

15 Claims, 11 Drawing Sheets

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

SPHERICAL ABERRATION(mm)

ASTIGMATISM(mm)

DISTORTION (%)

ZOOM LENS, IMAGE SENSING OPTICAL DEVICE AND DIGITAL APPLIANCE

This application is based on Japanese Patent Application No. 2013-172086 filed on Aug. 22, 2013, the contents of which are hereby incorporated by reference.

BACKGROUND OF THE INVENTION

1. Field of the Invention

The present invention relates to a zoom lens, an image sensing optical device and a digital appliance. For example, the present invention relates to: a zoom lens that is optimum for, among image sensing optical systems having a zoom function, an image sensing optical system whose angle of view at a wide-angle end exceeds 100°; an image sensing optical device that outputs, as an electrical signal, a picture of a subject taken in with the zoom lens and an image sensing element; and a digital appliance having an image input function, such as a digital camera, that incorporates such an image sensing optical device.

2. Description of Related Art

Conventionally, as a zoom lens suitable for an image sensing optical system, the following zoom lenses are proposed.

Patent document 1: Japanese Unexamined Patent Application Publication No. 2009-271165

Patent document 2: Japanese Unexamined Patent Application Publication No. 2012-108279

In general, since in a zoom lens whose angle of view at a wide-angle end exceeds 100°, the position of an on-axis marginal light ray that passes through a first group is lowered at a wide-angle end, when the zoom ratio of the lens is increased, variations in longitudinal chromatic aberration caused by zooming tend to be increased. Although in order to reduce variations in longitudinal chromatic aberration, it is effective to use an achromatic lens within the first group, this increases the number of lenses having a large diameter, with the result that the cost and the size of the lens system are increased.

In the zoom lens disclosed in patent document 1, in order to correct a longitudinal chromatic aberration, an achromatic lens is used within a first group. However, since the achromatic lens is not located in a position effective for correcting the longitudinal chromatic aberration because it is required to reduce the size, it is impossible to obtain an effect of sufficiently correcting the chromatic aberration. In the zoom lens disclosed in patent document 2, an achromatic lens is located in a position advantageous for correcting a longitudinal chromatic aberration. However, since the entire length of a first group is long, the diameter of the lens that is the closest to an object side with respect to the angle of view is increased, with the result that the size of the lens system is increased.

SUMMARY OF THE INVENTION

The present invention is made in view of the foregoing conditions; an object of the present invention is to provide a zoom lens whose angle of view at a wide-angle end exceeds 100°, whose size is reduced and which can have satisfactory optical performance over the entire zoom region, and an image sensing optical device and a digital appliance which include such a zoom lens.

According to one aspect of the present invention, a zoom lens is provided that performs zooming by moving a plurality of lens groups along an optical axis to change a distance between the groups, where at least a first group of negative optical power and a second group of positive optical power are included from an object side, when zooming is performed from a wide-angle end to a telephoto end, a distance between the first group and the second group is reduced, and an aperture is moved together with the second group, the first group is formed, from the object side, with a front group composed of only negative lenses and a rear group which is composed of two lenses, a positive lens and a negative lens, from the object side and which has a positive optical power as a whole and conditional formula (1) below is satisfied:

$$0.06 < T1/Lmax < 0.11 \tag{1}$$

where

T1 is a distance on the optical axis between the front group and the rear group in the first group, and Lmax is a maximum total length of the zoom lens in zooming.

According to another aspect of the present invention, an image sensing optical device is provided that includes: the zoom lens described above; and an image sensing element that converts an optical image formed on a light receiving surface into an electrical signal, where the zoom lens is provided such that an optical image of a subject is formed on the light receiving surface of the image sensing element.

According to yet another aspect of the present invention, a digital appliance is provided, where the digital appliance includes the image sensing optical device described above such that at least one of a function of shooting a still image of the subject and a function of shooting a moving image of the subject is added.

DETAILED DESCRIPTION OF PREFERRED EMBODIMENTS

Figure 1:
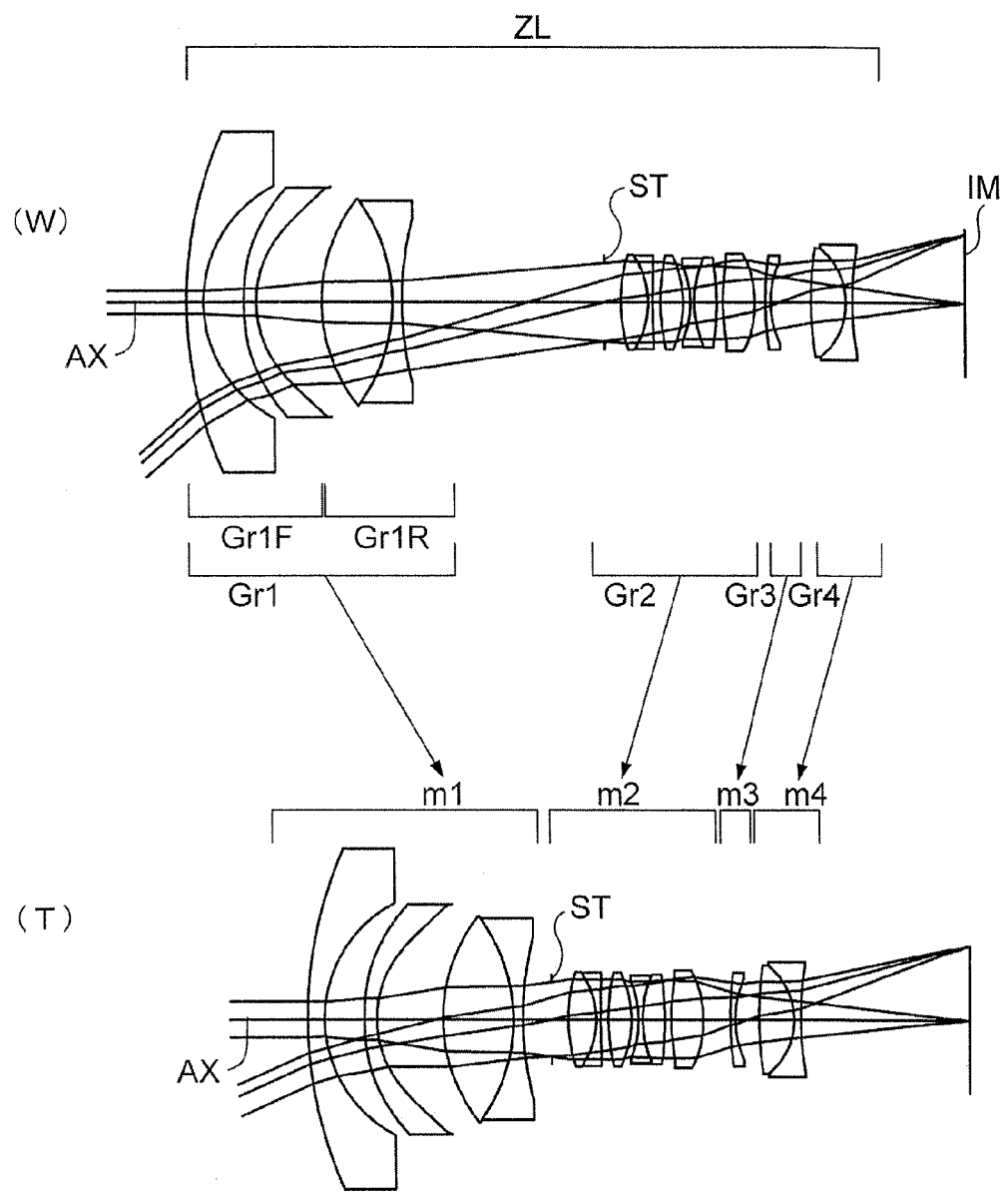
FIG. 1 is an optical configuration diagram of a first embodiment (Example 1)
Figure 2:
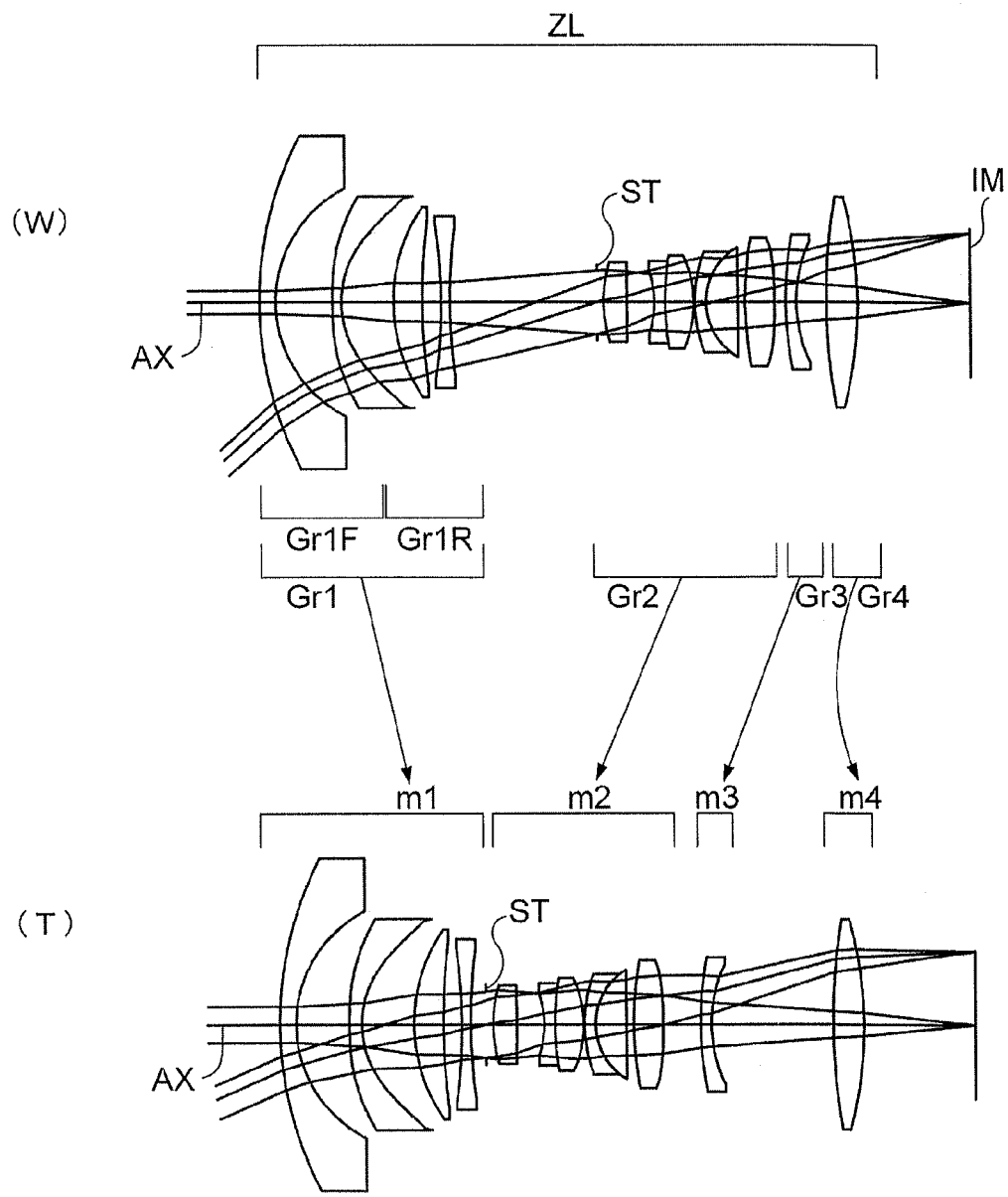
FIG. 2 is an optical configuration diagram of a second embodiment (Example 2)
Figure 3:
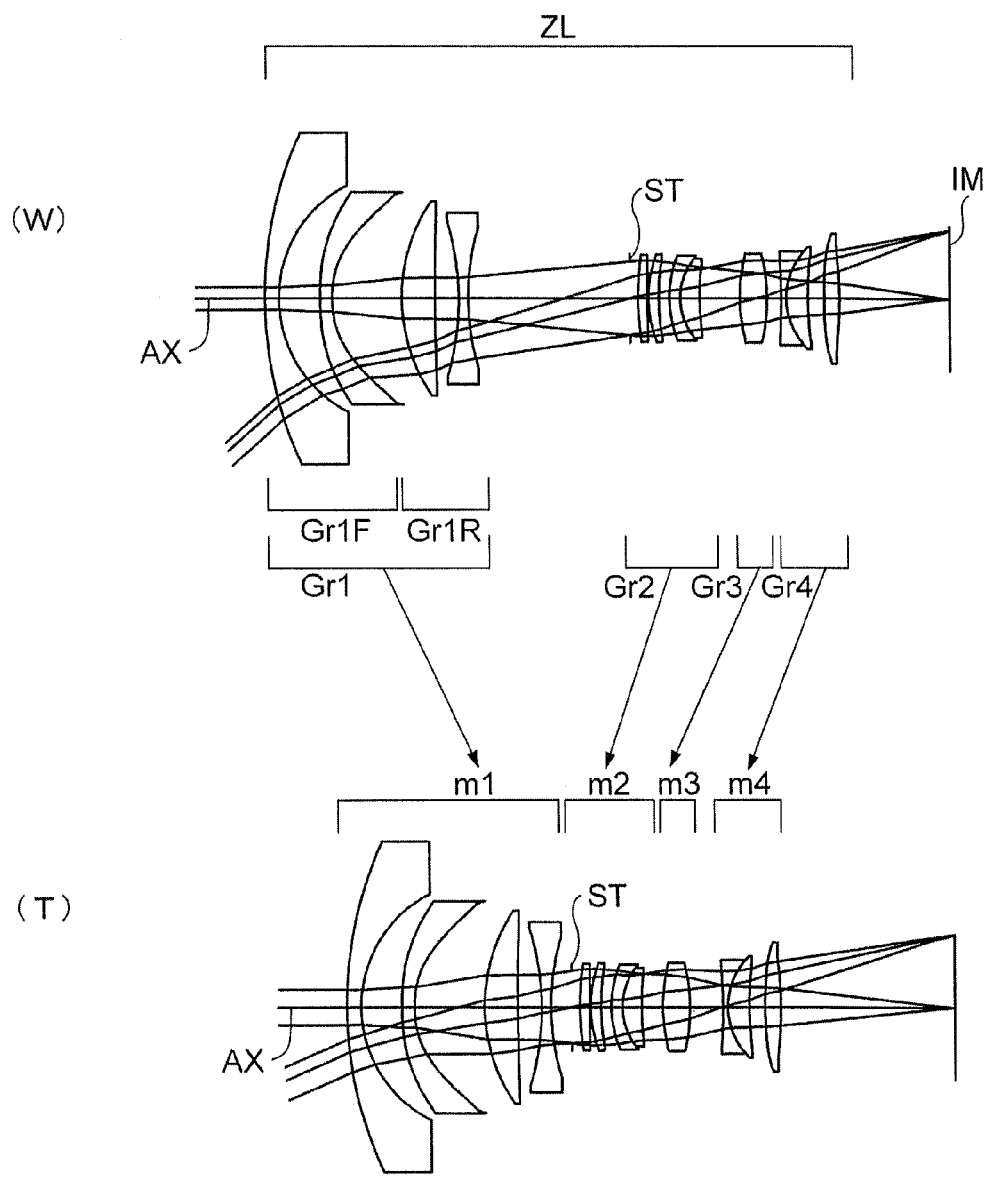
FIG. 3 is an optical configuration diagram of a third embodiment (Example 3)
Figure 4:
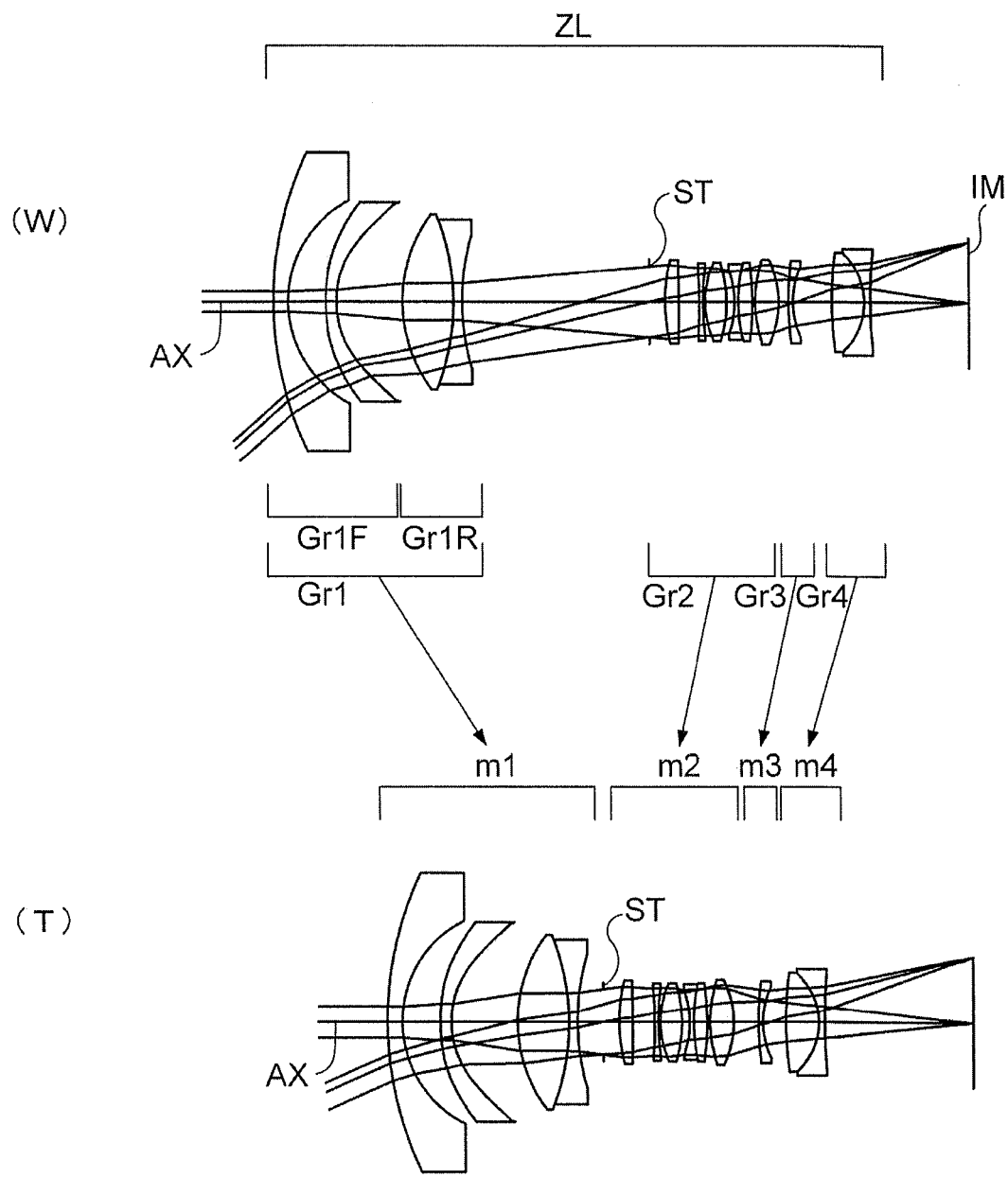
FIG. 4 is an optical configuration diagram of a fourth embodiment (Example 4)
Figure 5:
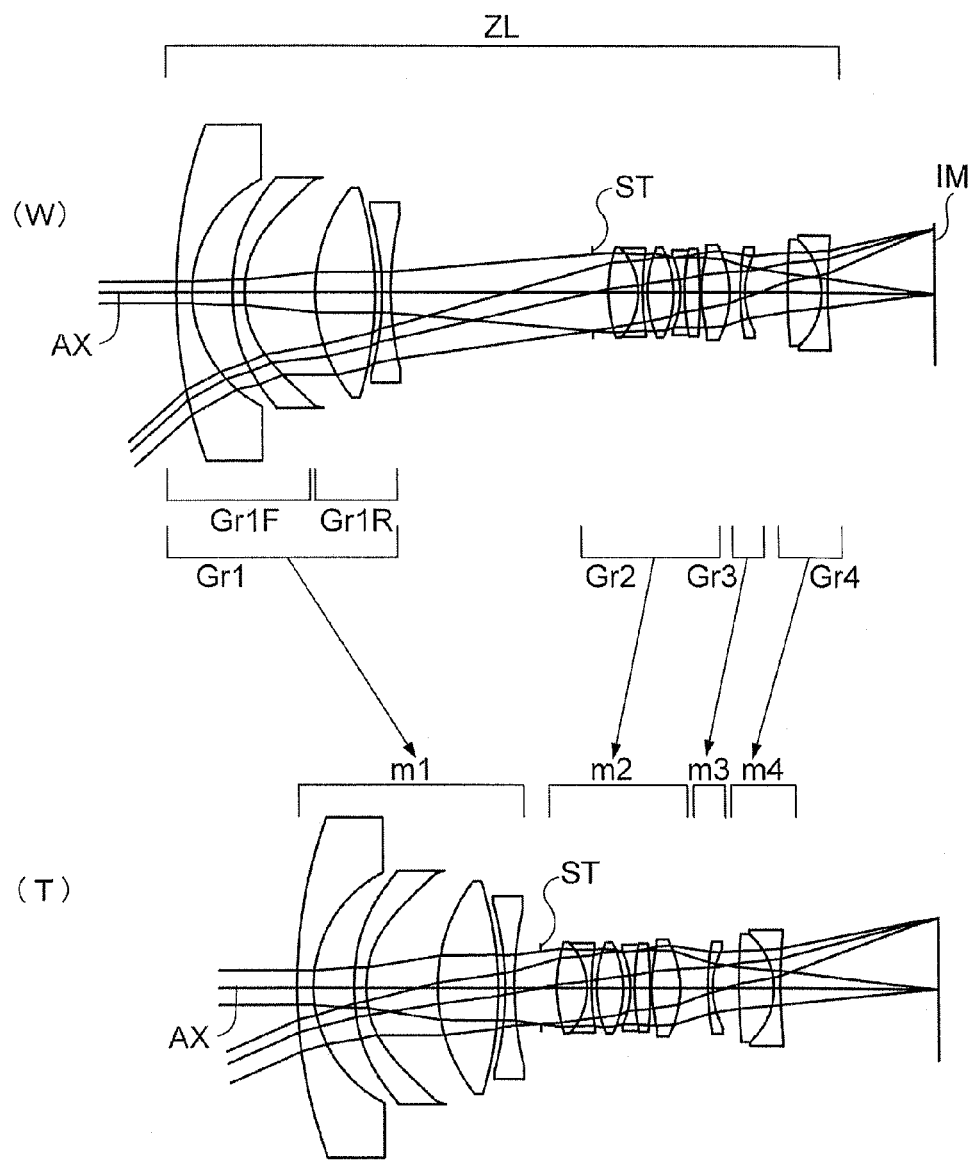
FIG. 5 is an optical configuration diagram of a fifth embodiment (Example 5)
Figure 6A:
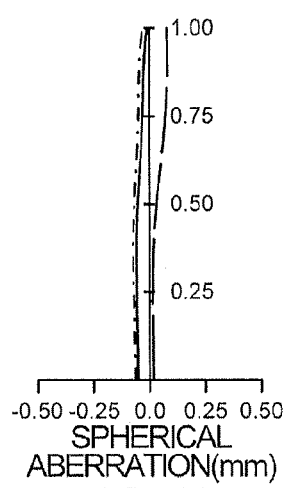
FIGS. 6A to 6I are diagrams of aberrations of Example 1.
Figure 6B:
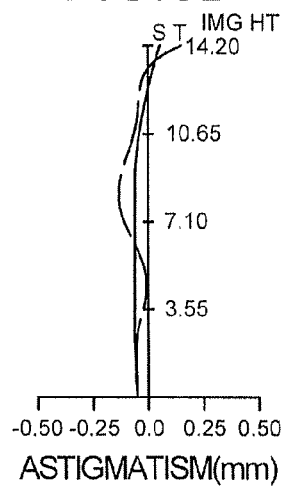
Figure 6C:
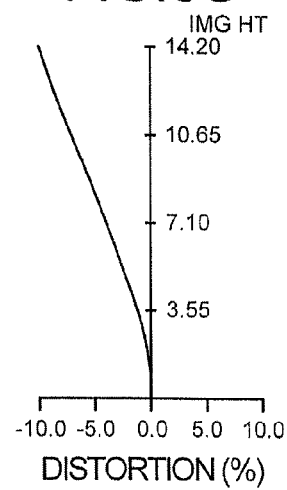
Figure 6D:
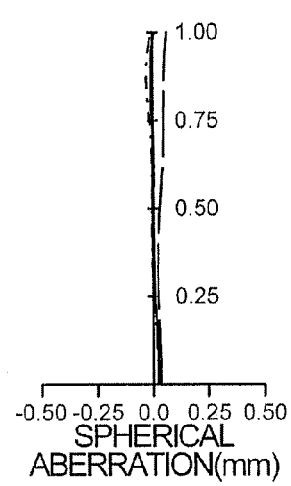
Figure 6E:
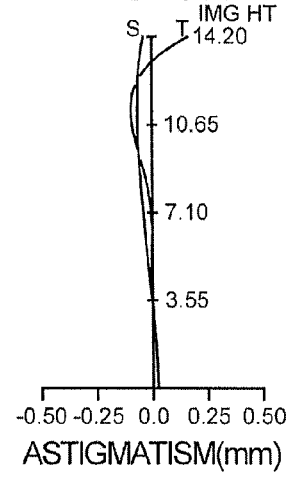
Figure 6F:
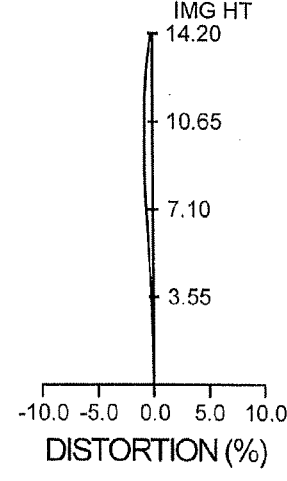
Figure 6G:
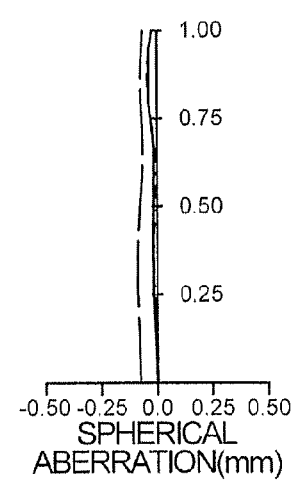
Figure 6H:
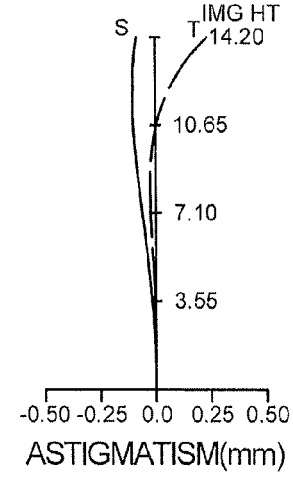
Figure 6I:
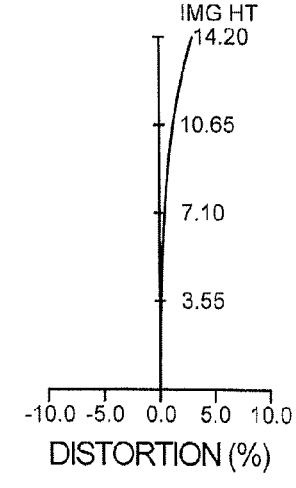
Figure 7A:
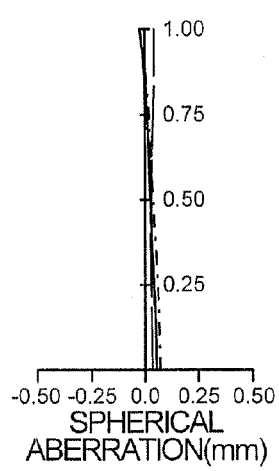
FIGS. 7A to 7I are diagrams of aberrations of Example 2.
Figure 7B:
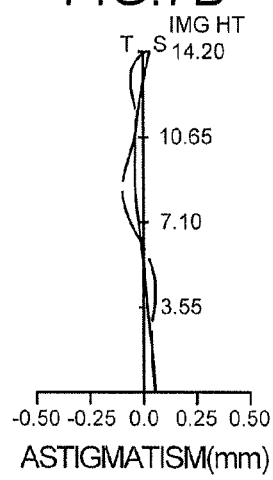
Figure 7C:
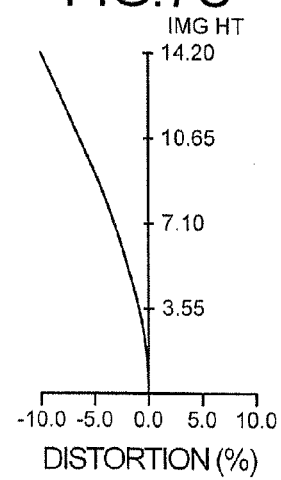
Figure 7D:
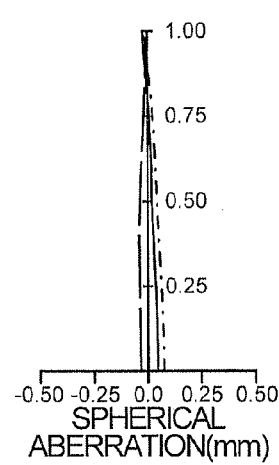
Figure 7E:
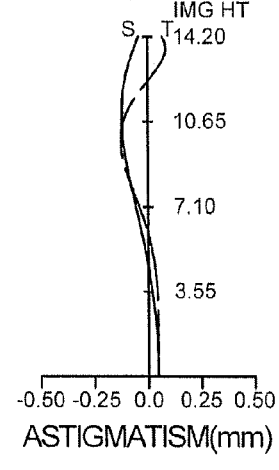
Figure 7F:
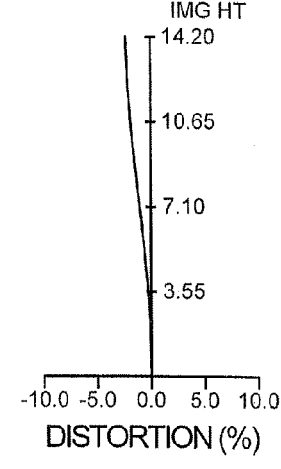
Figure 7G:
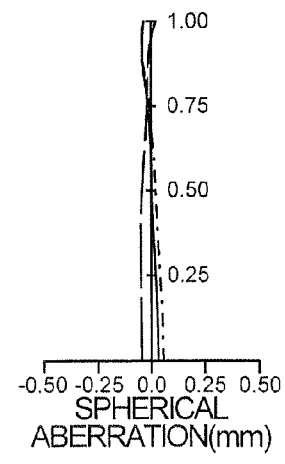
Figure 7H:
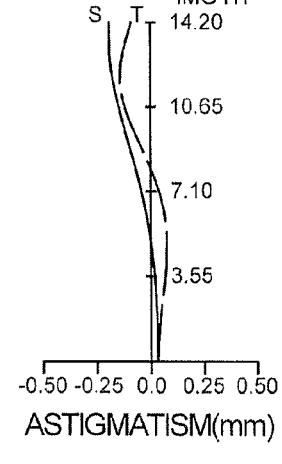
Figure 7I:
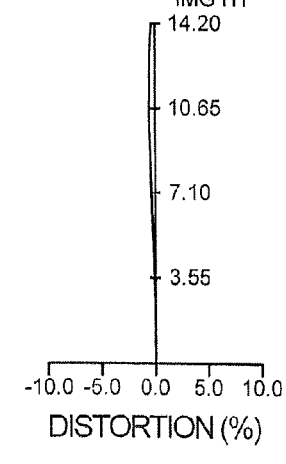
Figure 8A:
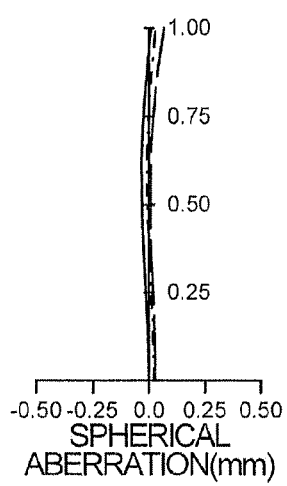
FIGS. 8A to 8I are diagrams of aberrations of Example 3.
Figure 8B:
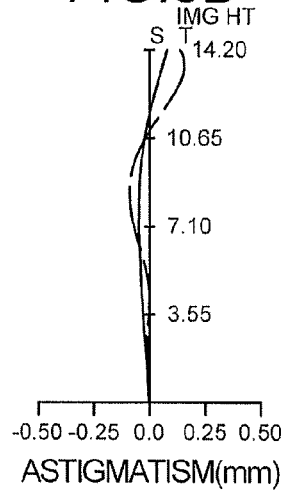
Figure 8C:
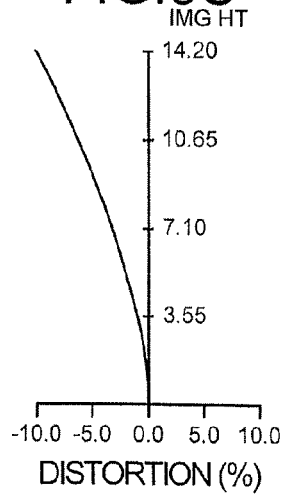
Figure 8D:
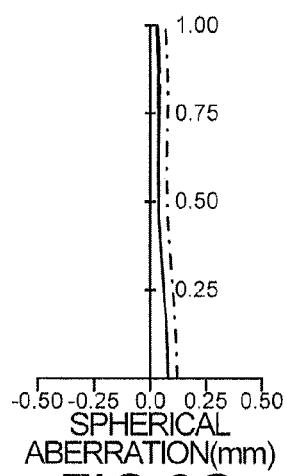
Figure 8E:
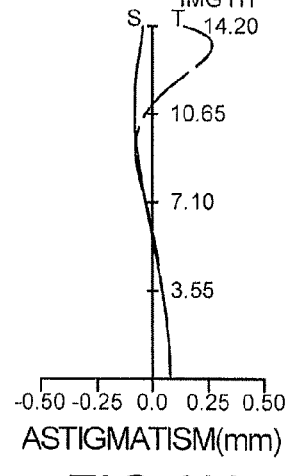
Figure 8F:
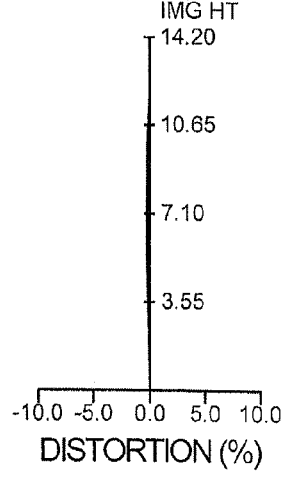
Figure 8G:
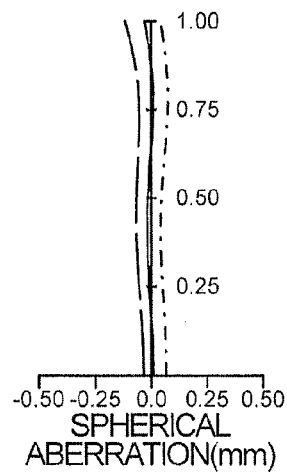
Figure 8H:
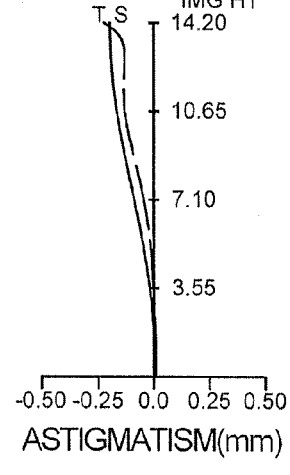
Figure 8I:
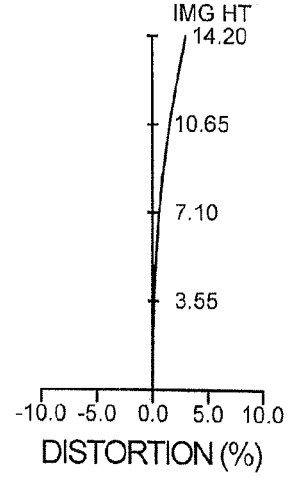
Figure 9A:
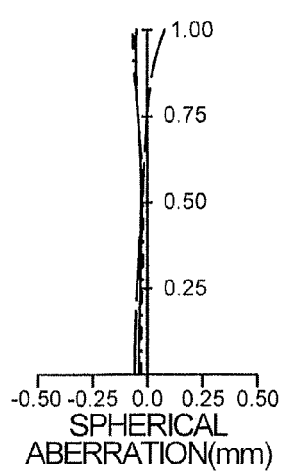
FIGS. 9A to 9I are diagrams of aberrations of Example 4.
Figure 9B:
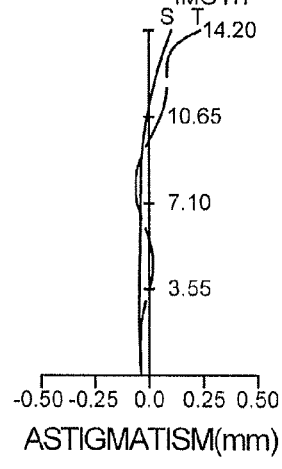
Figure 9C:
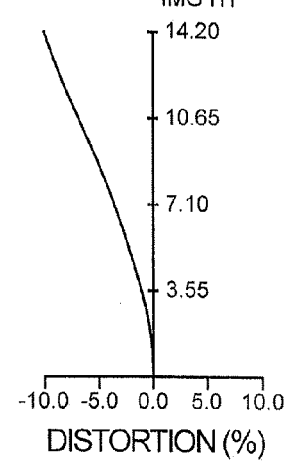
Figure 9D:
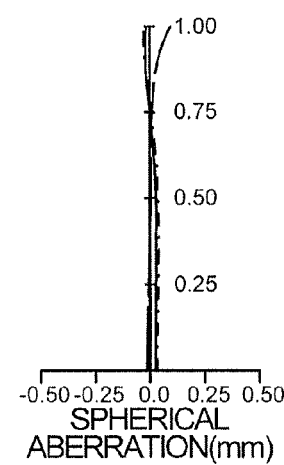
Figure 9E:
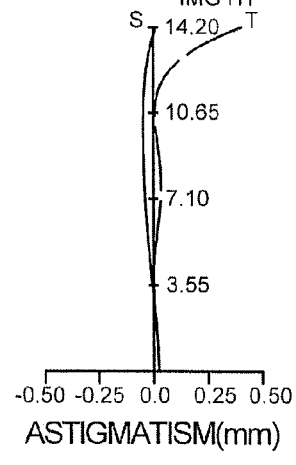
Figure 9F:
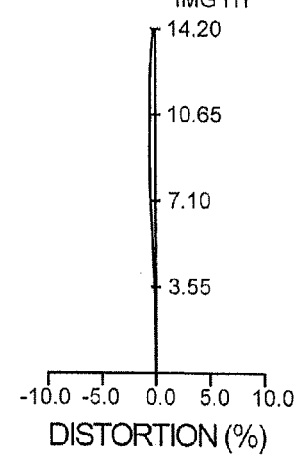
Figure 9G:
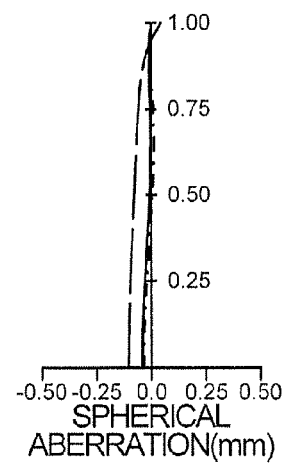
Figure 9H:
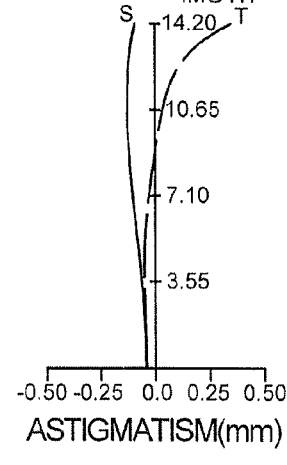
Figure 9I:
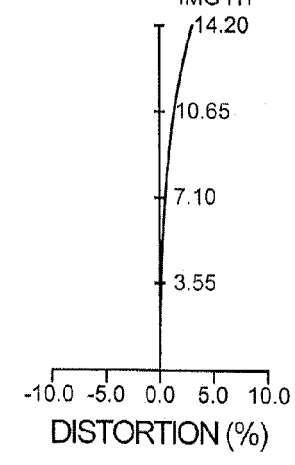
Figure 10A:
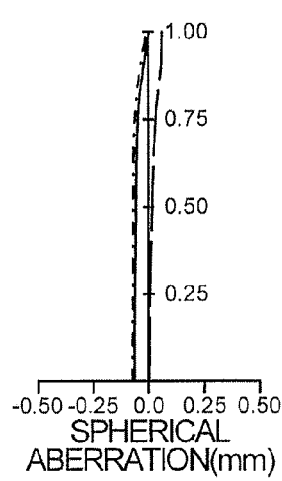
FIGS. 10A to 10I are diagrams of aberrations of Example 5.
Figure 10B:
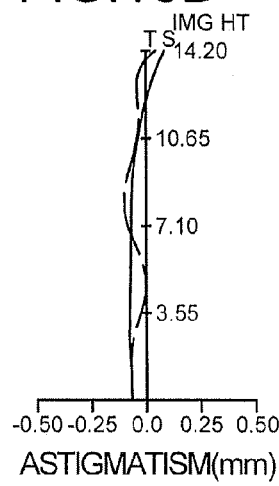
Figure 10C:
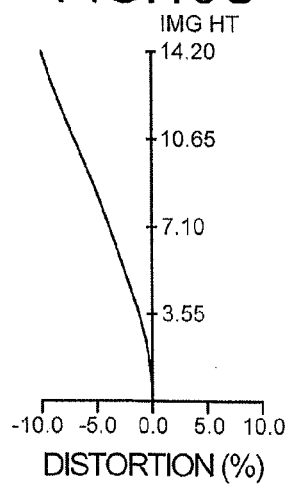
Figure 10D:
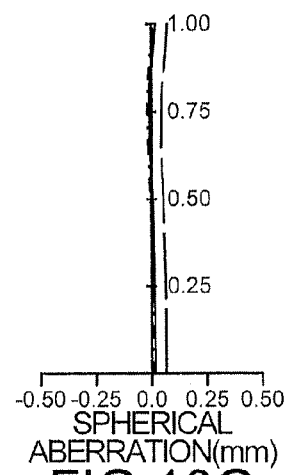
Figure 10E:
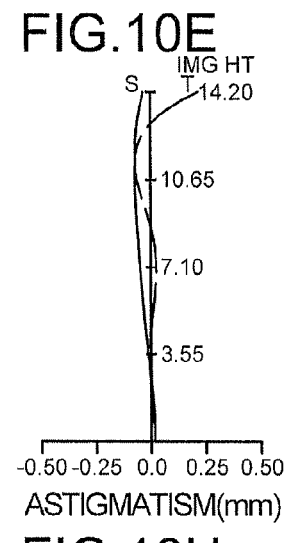
Figure 10F:
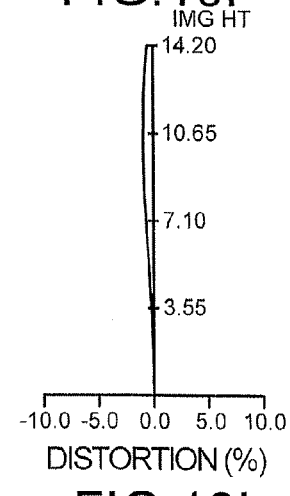
Figure 10G:
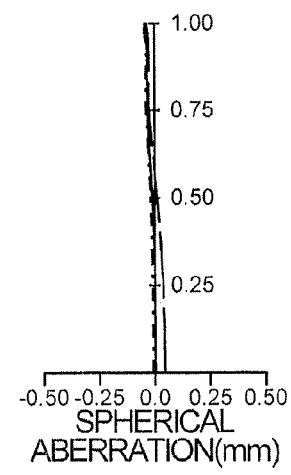
Figure 10H:
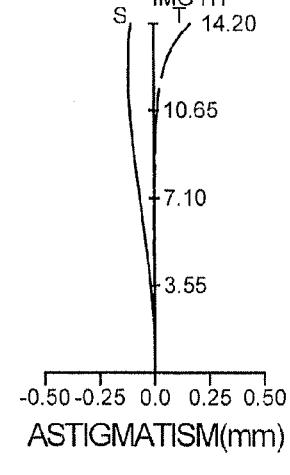
Figure 10I:
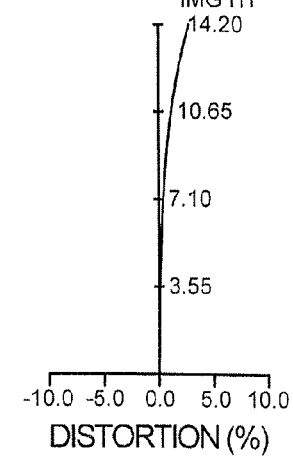

A zoom lens, an image sensing optical device and a digital appliance according to the present invention will be described below. The zoom lens of the present invention is a zoom lens that performs zooming by moving a plurality of lens groups along an optical axis to change the distance between the groups, where at least a first group of negative optical power and a second group of positive optical power are included from an object side (optical power: an amount that is defined by the reciprocal of a focal length), when zooming is performed from a wide-angle end to a telephoto end, the distance between the first group and the second group is reduced, and an aperture is moved together with the second group, the first group is formed, from the object side, with a front group composed of only negative lenses and a rear group which is composed of two lenses, a positive lens and a negative lens, from the object side and which has a positive optical power as a whole and conditional formula (1) below is satisfied:

$$0.06 < T1/Lmax < 0.11 \qquad (1)$$

where

T1 is a distance on the optical axis between the front group and the rear group in the first group, and Lmax is a maximum total length of the zoom lens in zooming.

In the configuration described above, in the zoom lens having the second group, which is moved together with the aperture and which is a variator group of positive optical power and the first group, which is a compensator group of negative optical power, the rear group for color correction is arranged within the first group, which can result in variations in longitudinal chromatic aberration caused by zooming. The color correction group is arranged on an image side where the longitudinal chromatic aberration is easily controlled, and thus it is possible to effectively correct the longitudinal chromatic aberration. In the color correction group, the positive lens and the negative lens are arranged from the object side, and the color correction group is made to have a positive optical power as a whole, and thus it is possible to raise an on-axis marginal light ray passing position in the color correction group, with the result that it is possible to further effectively correct the longitudinal chromatic aberration. Furthermore, the front group of the first group is composed of only negative lenses, and thus it is possible to reduce the diameter of the lens that is the closest to the object side.

Conditional formula (1) defines the distance on the axis between the front group and the rear group in the first group. When the distance falls below the lower limit of conditional formula (1), the distance between the front group and the rear group is excessively decreased, and thus the on-axis marginal light ray passing position in the rear group is lowered, with the result that the effect of correcting the longitudinal chromatic aberration is reduced. When the distance exceeds the upper limit of conditional formula (1), the length of the first group is excessively increased, and thus in a zoom lens whose angle of view at a wide-angle end exceeds 100°, it is difficult to reduce the diameter of the lens that is the closest to the object side. Hence, by satisfying conditional formula (1), it is possible to enhance the performance of the longitudinal chromatic aberration and reduce the size of the diameter of the lens in a balanced manner.

The zoom lens of the present invention can be regarded as being optimized such that the diameter of the lens which is the closest to the object side with respect to the angle of view satisfies conditional formula (1A) below:

$$0.3 < R1/\omega w < 0.5 \qquad (1A)$$

where

R1 is an effective radius of the lens closest to the object side, and

ωw is a half angle of view at a wide-angle end.

Conditional formula (1A) defines a range that is suitable for reasonably obtaining satisfactory optical performance over the entire zoom region even in a zoom lens having a large angle of view. When the radius exceeds the upper limit of conditional formula (1A), the size of the lens is excessively increased whereas when the radius falls below the lower limit of conditional formula (1A), it is necessary to increase the optical power of the front group in the first group, with the result that negative distortion is easily produced. Hence, by satisfying conditional formula (1A), it is possible to enhance the performance of the distortion and reduce the size of the diameter of the lens in a balanced manner.

With the characteristic configuration described above, it is possible to realize a zoom lens whose angle of view (2ω) at a wide-angle end exceeds 100°, whose size is reduced and which can have satisfactory optical performance over the entire zoom region, and an image sensing optical device which includes such a zoom lens. The zoom lens or the image sensing optical device is used in a digital appliance (for example, a digital camera), and thus it is possible to add a high-performance image input function to the digital appliance in a compact manner, with the result that, for example, it is possible to help reduce the size and the cost and enhance the performance and the function of the digital appliance. For example, since the zoom lens of the present invention is suitable as an interchangeable lens in digital cameras and video cameras, it is possible to realize a lightweight and small-sized interchangeable lens that is easy to carry. Conditions and the like for obtaining the above effects in a well-balanced manner and achieving further high optical performance, miniaturization and the like will be described below.

It is further preferable to satisfy conditional formula (1a) below:

$$0.07 < T1/Lmax < 0.11 \qquad (1a)$$

Conditional formula (1a) described above specifies, in the range of the conditions specified by conditional formula (1) described previously, a further preferable range of conditions based on the viewpoint described above and the like. Hence, preferably, conditional formula (1a) is satisfied, and thus it is possible to more enhance the above effects.

It is further preferable to satisfy conditional formula (1Aa) below.

$$0.4 < R1/\omega w < 0.45 \qquad (1Aa)$$

Conditional formula (1Aa) described above specifies, in the range of the conditions specified by conditional formula (1A) described previously, a further preferable range of conditions based on the viewpoint described above and the like. Hence, preferably, conditional formula (1Aa) is satisfied, and thus it is possible to more enhance the above effects.

It is preferable to satisfy conditional formula (2) below:

$$-0.25 < f1F/f1R < -0.10 \qquad (2)$$

where f1F is a focal length of the front group in the first group, and f1R is a focal length of the rear group in the first group.

Conditional formula (2) specifies a preferable range of an optical power ratio between the front group and the rear group in the first group. When the optical power ratio exceeds the upper limit of conditional formula (2), the optical power of the rear group is excessively reduced with respect to the front group, with the result that negative distortion is more easily produced within the first group. When the optical power ratio falls below the lower limit of conditional formula (2), the optical power of the rear group is excessively increased with respect to the front group, with respect to it is further difficult to reduce the diameter of the lens that is the closest to the object side. Hence, by satisfying conditional formula (2), it is possible to enhance the performance of the distortion and reduce the size of the diameter of the lens in a balanced manner.

It is further preferable to satisfy conditional formula (2a) below.

$$-0.22 < f1F/f1R < -0.12 \qquad (2a)$$

Conditional formula (2a) described above specifies, in the range of the conditions specified by conditional formula (2) described previously, a further preferable range of conditions based on the viewpoint described above and the like. Hence, preferably, conditional formula (2a) is satisfied, and thus it is possible to more enhance the above effects.

Preferably, at least one aspherical surface is included within the front group in the first group. At least one aspherical surface is arranged within the front group in the first group, and thus it is possible to further effectively reduce distortion in the first group.

Preferably, the front group in the first group is composed of two or less negative lenses. The front group is composed of two or less negative lenses, and thus it is possible to reduce, with a small number of lenses, the diameter of the lens that is the closest to the object side in the front group where the diameter of the lens is easily increased, with the result that it is possible to further reduce the cost.

It is preferable to satisfy conditional formula (3) below:

$$5<|vp-vn|<50 \qquad (3)$$

where
vp is an Abbe number indicating dispersion of the positive lens within the rear group in the first group, and
vn is an Abbe number indicating dispersion of the negative lens within the rear group in the first group.

Conditional formula (3) specifies a preferred dispersion difference (that is, a difference between the Abbe numbers) of the two lenses of the rear group in the first group. When the dispersion difference exceeds the upper limit of conditional formula (3), an amount of correction of a longitudinal chromatic aberration is excessively increased whereas when the dispersion difference falls below the lower limit of conditional formula (3), in contrast, the amount of correction of the longitudinal chromatic aberration is excessively decreased, with the result that the longitudinal chromatic aberration is left in both cases. Hence, by satisfying conditional formula (3), it is possible to more effectively reduce the longitudinal chromatic aberration.

It is further preferable to satisfy conditional formula (3a) below.

$$10<|vp-vn|<50 \qquad (3a)$$

Conditional formula (3a) described above specifies, in the range of the conditions specified by conditional formula (3) described previously, a further preferable range of conditions based on the viewpoint described above and the like. Hence, preferably, conditional formula (3a) is satisfied, and thus it is possible to more enhance the above effects.

Preferably, the rear group in the first group is formed with one cemented lens. The rear group is formed with one cemented lens, and thus it is possible to further easily acquire the distance between the front and rear groups in the first group, with the result that it is possible to achieve both the miniaturization and the aberration performance of the zoom lens.

Preferably, the zoom lens is a four-component zoom lens that includes, from the object side, the first group of negative optical power, the second group of positive optical power, a third group of negative optical power and a fourth group of negative optical power. As described above, in the four-component zoom configuration, the groups of negative optical power are arranged on the image side, and thus it is possible to reduce the diameter of the lens on the image side, with the result that it is possible to reduce not only the size of the first group but also the sizes of the third and fourth groups.

Preferably, in the four-component zoom lens, when zooming is performed from the wide-angle end to the telephoto end, a distance between the second group and the third group is increased, and a distance between the third group and the fourth group is reduced. As described above, the third group is moved differently from the second group, and thus it is possible to further enhance an image surface correction effect performed by the third group, and it is also possible to further reduce the size of the lenses of the fourth group by preventing the fourth group from being excessively moved away from the second group in zooming.

It is preferable to satisfy conditional formula (4) below:

$$2<f4/f3<4 \qquad (4)$$

where
f4 is the focal length of the fourth group, and
f3 is the focal length of the third group.

Conditional formula (4) specifies a preferred range of a focal length ratio between the third group and the fourth group. When the focal length ratio exceeds the upper limit of conditional formula (4), the optical power of the third group is excessively increased, and thus the diameter of the fourth group is increased. When the focal length ratio falls below the lower limit of conditional formula (4), the optical power of the third group is excessively decreased, and thus an off-axis light ray passing position in the fourth group is lowered, with the result that it is difficult to correct an off-axis aberration produced in the groups that are close to the image side from the second group. In other words, conditional formula (4) corresponds to conditions that are further suitable for obtaining a satisfactory off-axis aberration performance while the diameter of the groups on the side of the image is kept reduced.

It is further preferable to satisfy conditional formula (4a) below.

$$2.5<f4/f3<4 \qquad (4a)$$

Conditional formula (4a) described above specifies, in the range of the conditions specified by conditional formula (4) described previously, a further preferable range of conditions based on the viewpoint described above and the like. Hence, preferably, conditional formula (4a) is satisfied, and thus it is possible to more enhance the above effects.

Preferably, the fourth group is formed with one cemented lens. In this configuration, it is possible to further satisfactorily correct the off-axis aberration, especially, a lateral chromatic aberration while reducing the number of lenses in the fourth group, whose diameter is the most likely to be increased among the image side groups.

Preferably, the fourth group includes a positive lens and a negative lens, and conditional formula (5) below is satisfied:

$$5<|v4p-v4n|<50 \qquad (5)$$

where
v4p is an Abbe number indicating dispersion of the positive lens within the fourth group, and
v4n is an Abbe number indicating dispersion of the negative lens within the fourth group.

Conditional formula (5) specifies a preferred dispersion difference (that is, a difference between the Abbe numbers) of the lenses of the fourth group. When the dispersion difference exceeds the upper limit of conditional formula (5), an amount of correction of a lateral chromatic aberration is excessively increased whereas when the dispersion difference falls below the lower limit of conditional formula (5), in contrast, the amount of correction of the lateral chromatic aberration is excessively decreased, with the result that the lateral chromatic aberration is left in both cases. Hence, by satisfying conditional formula (5), it is possible to more effectively reduce the lateral chromatic aberration.

It is further preferable to satisfy conditional formula (5a) below.

$$5<|v4p-v4n|<20 \tag{5a}$$

Conditional formula (5a) described above specifies, in the range of the conditions specified by conditional formula (5) described previously, a further preferable range of conditions based on the viewpoint described above and the like. Hence, preferably, conditional formula (5a) is satisfied, and thus it is possible to more enhance the above effects.

Preferably, the fourth group is formed with a cemented lens that is composed of a positive lens and a negative lens from the object side. In this way, it is possible to raise the off-axis light ray passing position in the fourth group, with the result that it is possible to further effectively reduce the lateral chromatic aberration.

Preferably, the third group is formed with a negative single lens. In this way, it is possible to obtain a relative movement amount of the third group with respect to the second group, with the result that it is possible to further enhance the image surface correction effect in the third group in zooming.

The zoom lens of the present invention is suitably used as an image sensing lens for a digital appliance (for example, a lens interchangeable digital camera) having an image input function; it is combined with an image sensing element or the like, and thus it is possible to form an image sensing optical device that optically takes in the picture of a subject and outputs it as an electrical signal. The image sensing optical device is an optical device that forms a main constituent element of a camera used for shooting a still image or a moving image of the subject; for example, the image sensing optical device is configured by including, from the object side (that is, the subject), a zoom lens that forms an optical image of the object and an image sensing element that converts the optical image formed by the zoom lens into an electrical signal. Then, the zoom lens having the characteristic configuration described above is arranged such that the optical image of the subject is formed on the light receiving surface (that is, the image sensing surface) of the image sensing element, and thus it is possible to realize an image sensing optical device having a small size and high performance at a low cost and a digital appliance including such an image sensing optical device.

Examples of the digital appliance having the image input function include cameras such as a digital camera, a video camera, a monitoring camera, a vehicle-mounted camera and a TV telephone camera. The examples also include ones that has a camera function incorporated or externally provided in a personal computer, a portable digital appliance (for example, a cell phone, a smart phone (high-performance cell phone) and a mobile computer), their peripheral devices (such as a scanner and a printer) and other digital appliances. It is obvious from the above examples that it is possible not only to configure a camera with the image sensing optical device but also to add a camera function to various types of apparatuses by incorporating the image sensing optical device. For example, it is possible to configure a digital appliance having an image input function such as a camera-incorporating cell phone.

Figure 11:
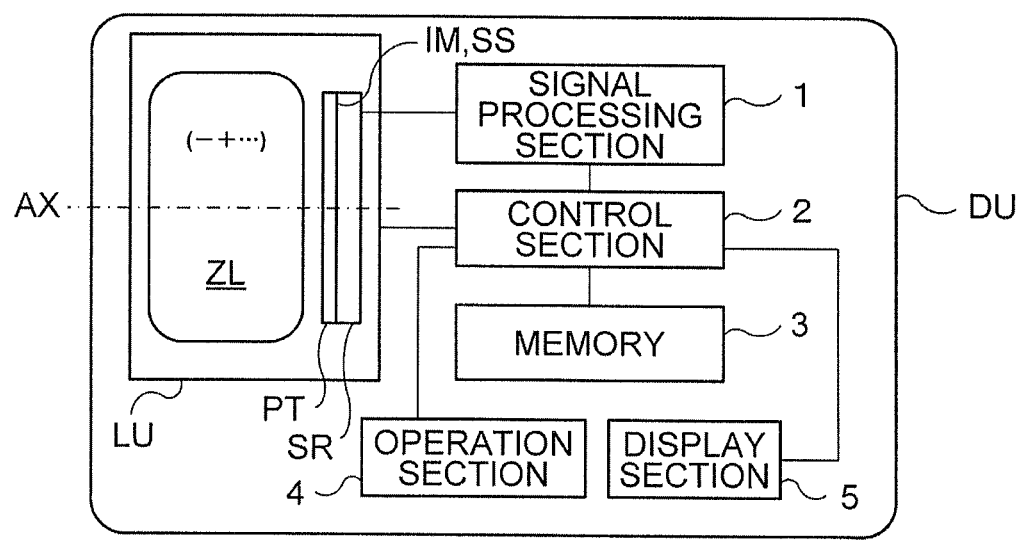
FIG. 11 is a schematic diagram showing an example of an outline of the configuration of a digital appliance incorporating a zoom lens.

In FIG. 11, as an example of the digital appliance having an image input function, an example of an outline configuration of a digital appliance DU is shown as a schematic cross-sectional view. An image sensing optical device LU incorporated in the digital appliance DU shown in FIG. 11 includes, from an object (that is, a subject) side, a zoom lens ZL (AX: optical axis) that forms an optical image (image surface) IM of the object such that the optical image can be zoomed up or down, a parallel flat surface plate PT (the cover glass of an image sensing element SR; corresponding to an optical filter or the like such as an optical low-pass filter or an infrared cut filter arranged as necessary) and the image sensing element SR that converts, with the zoom lens ZL, the optical image IM formed on a light receiving surface (image sensing surface) SS into an electrical signal. When the digital appliance DU having an image input function is formed with the image sensing optical device LU, though the image sensing optical device LU is generally arranged within its body, it is possible to adopt a form corresponding to the necessity for realizing a camera function. For example, the image sensing optical device LU formed as a unit can be removably or rotatably provided in the main body of the digital appliance DU.

The zoom lens ZL is a four-component zoom lens that includes, from the object side, negative and positive lens groups and that changes the distance between the groups to perform zooming from a wide-angle end to a telephoto end; a first group is formed, from the object side, with a front group composed of only negative lenses and a rear group which is composed of two lenses, a positive lens and a negative lens, from the object side and which has a positive optical power as a whole, and when zooming is performed from the wide-angle end to the telephoto end, the distance between the first group and the second group is reduced, and an aperture is moved together with the second group. As the image sensing element SR, for example, a solid-state image sensing element is used such as a CCD (charge coupled device) image sensor or a CMOS (complementary metal-oxide semiconductor) image sensor having a plurality of pixels. Since the zoom lens ZL is provided such that the optical image IM of the subject is formed on the light receiving surface SS which is the optical conversion section of the image sensing element SR, the optical image IM formed by the zoom lens ZL is converted into an electrical signal by the image sensing element SR.

The digital appliance DU includes, in addition to the image sensing optical device LU, a signal processing section 1, a control section 2, a memory 3, an operation section 4 and a display section 5. The signal generated in the image sensing element SR is subjected, in the signal processing section 1, to predetermined digital image processing, image compression processing or the like as necessary, is recorded as a digital picture signal in the memory 3 (such as a semiconductor memory or an optical disc) or is converted through a cable into an infrared signal or the like depending on the situation and is transferred to another apparatus (for example, the communication function of a cell phone). The control section 2 is formed with a microcomputer, and intensively controls, for example, shooting functions (such as a still image shooting function and a moving image shooting function), functions such as an image reproduction function and lens movement mechanisms such as for zooming, focusing and camera shake correction. For example, in order to perform at least one of the still image shooting and the moving image shooting of the subject, the control section 2 controls the image sensing optical device LU. The display section 5 is a section that includes a display such as a liquid crystal monitor, and uses an image signal converted by the image sensing element SR or image information recorded in the memory 3 to display an image. The operation section 4 is a section that includes operation members such as an operation button (for example, a release button) and an operation dial (for example, a shooting mode dial), and transmits information input by an operator to the control section 2.

Here, the specific optical configuration of the zoom lens ZL will be described in further detail with first to fifth embodiments. FIGS. 1 to 5 are optical configuration diagrams that respectively correspond to the zoom lenses ZL of the first to fifth embodiments, and show, with optical cross-sectional views, lens arrangements, lens shapes and the like at the wide-angle end (W) and the telephoto end (T). The zoom lens ZL is formed, from the object side, with a first group Gr1 having a negative optical power, a second group Gr2 having a positive optical power, a third group Gr3 having a negative or positive optical power and a fourth group Gr4 having a negative or positive optical power. The first group Gr1 is formed, from the object side, with a front group Gr1F composed of only negative lenses and a rear group Gr1R which is composed of two lenses, a positive lens and a negative lens from the object side and which has a positive optical power as a whole.

Arrows m1, m2, m3 and m4 in the optical configuration diagrams (FIGS. 1 to 5) schematically indicate the movements of the first group Gr1, the second group Gr2, the third group Gr3 and the fourth group Gr4 in zooming from the wide-angle end (W) to the telephoto end (T). As described above, in the zoom lens ZL, all the distances between the individual groups on the axis are changed, and thus magnification variation (that is, zooming) from the wide-angle end (W) to the telephoto end (T) is performed; in zooming, the first group Gr1, the second group Gr2, the third group Gr3 and the fourth group Gr4 are relatively and individually moved with respect to the image surface IM. An aperture (aperture stop) ST is located to the object side of the second group Gr2, and is moved together with the second group Gr2 during zooming. When zooming from the wide-angle end (W) to the telephoto end (T) is performed, the distance between the first group Gr1 and the second group Gr2 is reduced.

The first embodiment (FIG. 1) of the zoom lens ZL has a zoom configuration in which when zooming is performed with four components of negative-positive-negative-negative, the first to fourth groups Gr1 to Gr4 can be individually moved. In zooming from the wide-angle end (W) to the telephoto end (T), the first group Gr1 is moved toward the image side, and the second to fourth groups Gr2 to Gr4 are moved toward the object side. Here, the distance between the first group Gr1 and the second group Gr2 is reduced, the distance between the second group Gr2 and the third group Gr3 is increased, the distance between the third group Gr3 and the fourth group Gr4 is reduced and the distance between the fourth group Gr4 and the image surface IM is increased.

The second embodiment (FIG. 2) of the zoom lens ZL has a zoom configuration in which when zooming is performed with four components of negative-positive-negative-positive, the first to fourth groups Gr1 to Gr4 can be individually moved. In zooming from the wide-angle end (W) to the telephoto end (T), the first group Gr1 is moved toward the image side, the second group Gr2 and the third group Gr3 are moved toward the object side and the fourth group Gr4 is temporarily moved toward the object side and is thereafter returned to the image side. Here, the distance between the first group Gr1 and the second group Gr2 is reduced, the distance between the second group Gr2 and the third group Gr3 is increased, the distance between the third group Gr3 and the fourth group Gr4 is increased and the distance between the fourth group Gr4 and the image surface IM is increased and is thereafter reduced.

The third embodiment (FIG. 3) of the zoom lens ZL has a zoom configuration in which when zooming is performed with four components of negative-positive-positive-negative, the first to fourth groups Gr1 to Gr4 can be individually moved. In zooming from the wide-angle end (W) to the telephoto end (T), the first group Gr1 is moved toward the image side, and the second to fourth groups Gr2 to Gr4 are moved toward the object side. Here, the distance between the first group Gr1 and the second group Gr2 is reduced, the distance between the second group Gr2 and the third group Gr3 is reduced, the distance between the third group Gr3 and the fourth group Gr4 is increased and the distance between the fourth group Gr4 and the image surface IM is increased.

The fourth embodiment (FIG. 4) of the zoom lens ZL has a zoom configuration in which when zooming is performed with four components of negative-positive-negative-negative, the first to fourth groups Gr1 to Gr4 can be individually moved. In zooming from the wide-angle end (W) to the telephoto end (T), the first group Gr1 is moved toward the image side, and the second to fourth groups Gr2 to Gr4 are moved toward the object side. Here, the distance between the first group Gr1 and the second group Gr2 is reduced, the distance between the second group Gr2 and the third group Gr3 is increased, the distance between the third group Gr3 and the fourth group Gr4 is reduced and the distance between the fourth group Gr4 and the image surface IM is increased.

The fifth embodiment (FIG. 5) of the zoom lens ZL has a zoom configuration in which when zooming is performed with four components of negative-positive-negative-negative, the first to fourth groups Gr1 to Gr4 can be individually moved. In zooming from the wide-angle end (W) to the telephoto end (T), the first group Gr1 is moved toward the image side, and the second to fourth groups Gr2 to Gr4 are moved toward the object side. Here, the distance between the first group Gr1 and the second group Gr2 is reduced, the distance between the second group Gr2 and the third group Gr3 is increased, the distance between the third group Gr3 and the fourth group Gr4 is reduced and the distance between the fourth group Gr4 and the image surface IM is increased.

The individual groups in the first embodiment (FIG. 1) are configured as follows from the object side when the paraxial surface shapes of the individual lenses are seen. The first group Gr1 is formed with the front group Gr1F and the rear group Gr1R, and the front group Gr1F is formed with two negative meniscus lenses concave to the image side (among them, the lens on the image side is a double-sided aspherical lens), and the rear group Gr1R is formed with a cemented lens composed of a biconvex positive lens and a biconcave negative lens. The second group Gr2 is formed with a cemented lens composed of a biconvex positive lens and a biconcave negative lens, a biconvex positive lens, a cemented lens composed of a biconcave negative lens and a biconvex positive lens and a biconvex double-sided aspherical lens, and the aperture ST is arranged to the object side of the second group Gr2. The third group Gr3 is formed with one negative meniscus lens concave to the image side. The fourth group Gr4 is formed with one cemented lens composed of a biconvex positive lens and a biconcave negative lens.

The individual groups in the second embodiment (FIG. 2) are configured as follows from the object side when the paraxial surface shapes of the individual lenses are seen. The first group Gr1 is formed with the front group Gr1F and the rear group Gr1R, and the front group Gr1F is formed with two negative meniscus lenses concave to the image side (among them, the lens on the image side is a double-sided aspherical lens), and the rear group Gr1R is formed with a positive meniscus lens convex to the object side and a biconcave negative lens. The second group Gr2 is formed with a biconvex double-sided aspherical lens, a cemented lens composed of a biconcave negative lens and a biconvex positive lens, a cemented lens composed of a negative meniscus lens concave to the image side and a biconvex positive lens and a biconvex double-sided aspherical lens, and the aperture ST is arranged to the object side of the second group Gr2. The third group Gr3 is formed with one negative meniscus lens concave to the image side. The fourth group Gr4 is formed with one biconvex positive lens.

The individual groups in the third embodiment (FIG. 3) are configured as follows from the object side when the paraxial surface shapes of the individual lenses are seen. The first group Gr1 is formed with the front group Gr1F and the rear group Gr1R, and the front group Gr1F is formed with two negative meniscus lenses concave to the image side (among them, the lens on the image side is a double-sided aspherical lens), and the rear group Gr1R is formed with a positive meniscus lens convex to the object side and a biconcave negative lens. The second group Gr2 is formed with two positive meniscus lenses convex to the object side and a cemented lens composed of a negative meniscus lens concave to the image side and a positive meniscus lens convex to the object side, and the aperture ST is arranged to the object side of the second group Gr2. The third group Gr3 is formed with one biconvex double-sided aspherical lens. The fourth group Gr4 is formed with a cemented lens composed of a biconcave negative lens and a positive meniscus lens convex to the object side and a biconvex double-sided aspherical lens.

The individual groups in the fourth embodiment (FIG. 4) are configured as follows from the object side when the paraxial surface shapes of the individual lenses are seen. The first group Gr1 is formed with the front group Gr1F and the rear group Gr1R, and the front group Gr1F is formed with two negative meniscus lenses concave to the image side (among them, the lens on the image side is a double-sided aspherical lens), and the rear group Gr1R is formed with a cemented lens composed of a biconvex positive lens and a biconcave negative lens. The second group Gr2 is formed with a biconvex positive lens, a biconcave negative lens, a biconvex positive lens, a cemented lens composed of a biconcave negative lens and a biconvex positive lens and a biconvex double-sided aspherical lens, and the aperture ST is arranged to the object side of the second group Gr2. The third group Gr3 is formed with one negative meniscus lens concave to the image side. The fourth group Gr4 is formed with one cemented lens composed of a biconvex positive lens and a biconcave negative lens.

The individual groups in the fifth embodiment (FIG. 5) are configured as follows from the object side when the paraxial surface shapes of the individual lenses are seen. The first group Gr1 is formed with the front group Gr1F and the rear group Gr1R, and the front group Gr1F is formed with two negative meniscus lenses concave to the image side (among them, the lens on the image side is a double-sided aspherical lens), and the rear group Gr1R is formed with a biconvex positive lens and a biconcave negative lens. The second group Gr2 is formed with a cemented lens composed of a biconvex positive lens and a biconcave negative lens, a biconvex positive lens, a cemented lens composed of a biconcave negative lens and a biconvex positive lens and a biconvex double-sided aspherical lens, and the aperture ST is arranged to the object side of the second group Gr2. The third group Gr3 is formed with one negative meniscus lens concave to the image side. The fourth group Gr4 is formed with one cemented lens composed of a biconvex positive lens and a biconcave negative lens.

EXAMPLES

The configurations and the like of the zoom lens according to the present invention will be more specifically described below with construction data and the like on examples. Examples 1 to 5 (EXs 1 to 5) described here are numerical examples that respectively correspond to the first to fifth embodiments described above; the optical configuration diagrams (FIGS. 1 to 5) of the first to fifth embodiments show the lens arrangements, the lens shapes, the optical paths and the like of corresponding examples 1 to 5.

In the construction data of each practical example, listed as surface data are, from left to right, surface number i, radius of curvature r (mm), axial surface-to-surface distance d (mm), refractive index nd for the d-line (with a wavelength of 587.56 nm), and Abbe number νd for the d-line. A surface whose surface number is marked with an asterisk "*" is an aspherical surface, of which the surface shape is defined by formula (AS) below in a local rectangular coordinate system (x, y, z) having its origin at the vertex of the surface. Listed as aspherical surface data are aspherical surface coefficients etc. In the aspherical surface data of each practical example, any absent term indicates that the corresponding coefficient equals zero, and throughout the data, "e–n" stands for "×10$^{-n}$."

$$z=(c \cdot h^2)/[1+\sqrt{1-(1+K) \cdot c^2 \cdot h^2}]+\Sigma(Aj \cdot h^j) \quad (AS)$$

where
h represents the height in the direction perpendicular to the z-axis (optical axis AX) ($h^2=x^2+y^2$);
z represents the amount of sag in the optical axis AX direction at the height h (relative to the vertex of the surface);
c represents the curvature (the reciprocal of the radius of curvature) at the vertex of the surface;
K represents a conic constant; and
Aj represents the aspherical surface coefficient of order j.

As miscellaneous data, zoom ratio is shown; furthermore with respect to each of focal length states W, M and T, the focal length of the entire system (F1, mm), f-number (Fno.), the half-angle of view (ω, °), image height (y' max, mm), total lens length (TL, mm), back focus (BF, mm) and variable surface-to-surface distance (di, i: surface number, mm) are shown; as zoom lens group data, the focal length (f1, f2, f3, f4; mm) of each lens group is shown. Here, the back focus BF is given as an air equivalent length from the last lens surface to the paraxial image surface, and the total lens length TL is the sum of the distance from the foremost lens surface to the last lens surface and the back focus BF. In table 1, values corresponding to the conditional formulas in the examples are shown.

FIGS. 6A to 6I, 7A to 7I, 8A to 8I, 9A to 9I and 10A to 10I are diagrams of aberrations corresponding to examples 1 to 5 (EXs 1 to 5) (longitudinal aberration diagrams in an infinity in-focus state); FIGS. 6A to 6C, 7A to 7C, 8A to 8C, 9A to 9C and 10A to 10C show aberrations at a wide-angle end W, FIGS. 6D to 6F, 7D to 7F, 8D to 8F, 9D to 9F and 10D to 10F show aberrations in a middle focal length state M and FIGS. 6G to 6I, 7G to 7I, 8G to 8I, 9G to 9I and 10G to 10I show aberrations at a telephoto end T. In FIGS. 6A to 6I, 7A to 7I, 8A to 8I, 9A to 9I and 10A to 10I, FIGS. 6A, 6D, 6G, 7A, 7D, 7G, 8A, 8D, 8G, 9A, 9D, 9G, 10A, 10D and 10G are spherical aberration diagrams, FIGS. 6B, 6E, 6H, 7B, 7E, 7H, 8B, 8E, 8H, 9B, 9E, 9H, 10B, 10E and 10H are astigmatism diagrams and FIGS. 6C, 6F, 6I, 7C, 7F, 7I, 8C, 8F, 8I, 9C, 9F, 9I, 10C, 10F and 10I are distortion diagrams.

In spherical aberration diagrams, a solid line represents the amount of spherical aberration for the d-line (with a wavelength of 587.56 nm), a dash-and-dot line represents the amount of spherical aberration for the C-line (with a wavelength of 656.28 nm), and a broken line represents the amount of spherical aberration for the g-line (with a wavelength of 435.84 nm), all in terms of deviations (mm) from the paraxial image surface in the optical axis AX direction, the vertical axis representing the height of incidence at the pupil as normalized with respect to the maximum height of incidence (hence, the relative height at the pupil). In astigmatism diagrams, a broken line T represents the tangential image surface for the d-line, and a solid line S represents the sagittal image surface for the d-line, both in terms of deviations (mm) from the paraxial image surface in the optical axis AX direction, the vertical axis representing the image height (IMG HT, in mm). In distortion diagrams, the horizontal axis represents the distortion (%) for the d-line, and the vertical axis represents the image height (IMG HT, in mm). The maximum value of the image height IMG HT corresponds to one-half of the diagonal length of the light-receiving surface SS of the image sensing device SR.

Example 1

Unit: mm

Surface Data

| i | r | d | nd | vd |
|---|---|---|---|---|
| object | infinity | infinity | | |
| 1 | 56.924 | 2.300 | 1.83481 | 42.72 |
| 2 | 17.710 | 5.487 | | |
| 3* | 34.394 | 1.700 | 1.80610 | 40.40 |
| 4* | 15.731 | 9.026 | | |
| 5 | 22.325 | 9.744 | 1.64769 | 33.84 |
| 6 | −23.228 | 0.010 | 1.51400 | 42.84 |
| 7 | −23.228 | 1.300 | 1.77250 | 49.62 |
| 8 | 44.093 | variable | | |
| 9 (stop) | infinity | 2.270 | | |
| 10 | 20.881 | 3.792 | 1.71736 | 29.50 |
| 11 | −11.260 | 0.010 | 1.51400 | 42.84 |
| 12 | −11.260 | 0.600 | 1.83481 | 42.72 |
| 13 | 122.631 | 1.063 | | |
| 14 | 27.410 | 3.163 | 1.49700 | 81.61 |
| 15 | −14.907 | 0.978 | | |
| 16 | −13.790 | 0.600 | 1.74077 | 27.76 |
| 17 | 14.948 | 0.010 | 1.51400 | 42.84 |
| 18 | 14.948 | 3.046 | 1.59282 | 68.62 |
| 19 | −38.631 | 0.850 | | |
| 20* | 24.676 | 4.460 | 1.58913 | 61.15 |
| 21* | −15.118 | variable | | |
| 22 | 47.667 | 0.700 | 1.74950 | 35.04 |
| 23 | 12.602 | variable | | |
| 24 | 46.578 | 4.813 | 1.78472 | 25.72 |
| 25 | −9.457 | 0.010 | 1.51400 | 42.84 |
| 26 | −9.457 | 0.900 | 1.91082 | 35.25 |
| 27 | 40.891 | variable | | |
| image | infinity | | | |

Aspherical Surface Data

| i | K | A4 | A6 | A8 |
|---|---|---|---|---|
| 3 | 0.0000e+000 | 9.1690e−005 | −3.2158e−007 | −2.3699e−010 |
| 4 | 0.0000e+000 | 7.7431e−005 | −4.8973e−008 | −6.4660e−009 |
| 20 | 0.0000e+000 | −9.8383e−005 | −1.6125e−006 | 2.6597e−008 |
| 21 | 0.0000e+000 | 2.6470e−005 | −1.5598e−006 | 1.7659e−008 |

Aspherical Surface Data

| i | A10 | A12 | A14 | A16 |
|---|---|---|---|---|
| 3 | 5.1922e−012 | −1.0388e−014 | 0.0000e+000 | 0.0000e+000 |
| 4 | 4.0731e−011 | −9.3837e−014 | 0.0000e+000 | 0.0000e+000 |
| 20 | −8.9345e−010 | 0.0000e+000 | 0.0000e+000 | 0.0000e+000 |
| 21 | −5.7028e−010 | 0.0000e+000 | 0.0000e+000 | 0.0000e+000 |

Unit: mm

Miscellaneous Data
Zoom Ratio 2.01

| | Wide angle (W) | Middle (M) | Telephoto (T) |
|---|---|---|---|
| Fl | 11.201 | 16.848 | 22.496 |
| Fno. | 3.580 | 4.095 | 4.610 |
| ω | 51.735 | 40.125 | 32.261 |
| y'max | 14.200 | 14.200 | 14.200 |
| TL | 106.506 | 94.476 | 90.483 |
| BF | 14.783 | 18.760 | 22.704 |
| d8 | 27.863 | 11.857 | 3.920 |
| d21 | 1.500 | 2.706 | 3.708 |
| d23 | 5.527 | 4.320 | 3.318 |

Zoom Lens Group Data

| Group | (Surface) | Focal Length |
|---|---|---|
| 1 | (1-8) | −18.034 |
| 2 | (9-21) | 15.433 |
| 3 | (22-23) | −23.054 |
| 4 | (24-27) | −58.541 |

Example 2

Unit: mm

Surface Data

| i | r | d | nd | vd |
|---|---|---|---|---|
| object | infinity | infinity | | |
| 1 | 48.471 | 2.200 | 1.72916 | 54.67 |
| 2 | 17.201 | 7.218 | | |
| 3* | 66.439 | 1.700 | 1.58913 | 61.15 |
| 4* | 14.304 | 7.050 | | |
| 5 | 22.295 | 4.017 | 1.90366 | 31.31 |
| 6 | 84.701 | 2.562 | | |
| 7 | −69.356 | 1.200 | 1.72916 | 54.67 |
| 8 | 77.422 | variable | | |
| 9 (stop) | infinity | 0.945 | | |
| 10* | 18.566 | 3.179 | 1.80610 | 40.40 |
| 11* | −490.076 | 3.778 | | |
| 12 | −13.181 | 1.500 | 1.64769 | 33.84 |
| 13 | 36.968 | 0.010 | 1.51400 | 42.84 |
| 14 | 36.968 | 3.886 | 1.49700 | 81.61 |
| 15 | −14.809 | 0.147 | | |
| 16 | 19.154 | 1.500 | 1.83481 | 42.72 |
| 17 | 8.547 | 0.010 | 1.51400 | 42.84 |
| 18 | 8.547 | 4.231 | 1.49700 | 81.61 |
| 19 | −1872.182 | 1.005 | | |
| 20* | 40.584 | 4.037 | 1.68893 | 31.08 |
| 21* | −73.996 | variable | | |
| 22 | 47.279 | 1.452 | 1.91082 | 35.25 |
| 23 | 19.127 | variable | | |
| 24 | 85.037 | 4.219 | 1.72916 | 54.67 |
| 25 | −53.176 | variable | | |
| image | infinity | | | |

Aspherical Surface Data

| i | K | A4 | A6 | A8 |
|---|---|---|---|---|
| 3 | 0.0000e+000 | 1.4531e−004 | −9.7285e−007 | 3.1634e−009 |
| 4 | 0.0000e+000 | 1.1009e−004 | −3.8405e−007 | −1.1322e−008 |
| 10 | 0.0000e+000 | 9.2909e−005 | 9.0440e−007 | −2.9437e−008 |
| 11 | 0.0000e+000 | −3.4238e−006 | 1.4551e−006 | −6.0776e−008 |
| 20 | 0.0000e+000 | −3.5225e−005 | 2.3212e−007 | −1.3502e−008 |
| 21 | 0.0000e+000 | −4.2448e−005 | −4.2168e−007 | −5.9722e−009 |

-continued

Unit: mm

Aspherical Surface Data

| i | A10 | A12 | A14 | A16 |
|---|---|---|---|---|
| 3 | 2.4297e−012 | −5.2203e−015 | 0.0000e+000 | 0.0000e+000 |
| 4 | 9.8563e−011 | −2.7977e−013 | 0.0000e+000 | 0.0000e+000 |
| 10 | 8.5743e−010 | 0.0000e+000 | 0.0000e+000 | 0.0000e+000 |
| 11 | 1.5756e−009 | 0.0000e+000 | 0.0000e+000 | 0.0000e+000 |
| 20 | 1.6688e−010 | 0.0000e+000 | 0.0000e+000 | 0.0000e+000 |
| 21 | 2.0795e−011 | 0.0000e+000 | 0.0000e+000 | 0.0000e+000 |

Miscellaneous Data
Zoom Ratio 2.01

| | Wide angle (W) | Middle (M) | Telephoto (T) |
|---|---|---|---|
| Fl | 11.201 | 16.848 | 22.496 |
| Fno. | 3.580 | 4.107 | 4.610 |
| ω | 51.734 | 40.125 | 32.261 |
| y'max | 14.200 | 14.200 | 14.200 |
| TL | 96.538 | 90.532 | 94.469 |
| BF | 14.888 | 15.370 | 14.868 |
| d8 | 20.184 | 7.105 | 2.136 |
| d21 | 1.500 | 4.191 | 5.100 |
| d23 | 4.120 | 8.021 | 16.520 |

Zoom Lens Group Data

| Group | (Surface) | Focal Length |
|---|---|---|
| 1 | (1-8) | −20.128 |
| 2 | (9-21) | 20.836 |
| 3 | (22-23) | −36.156 |
| 4 | (24-25) | 45.454 |

Example 3

Unit: mm

Surface Data

| i | r | d | nd | vd |
|---|---|---|---|---|
| object | infinity | infinity | | |
| 1 | 54.305 | 2.000 | 1.72916 | 54.67 |
| 2 | 17.521 | 5.683 | | |
| 3* | 47.338 | 1.700 | 1.68893 | 31.08 |
| 4* | 14.743 | 9.761 | | |
| 5 | 23.672 | 4.657 | 1.80610 | 33.27 |
| 6 | 371.629 | 3.323 | | |
| 7 | −36.530 | 1.300 | 1.49700 | 81.61 |
| 8 | 33.346 | variable | | |
| 9 (stop) | infinity | 1.136 | | |
| 10 | 37.754 | 1.354 | 1.72916 | 54.67 |
| 11 | 934.340 | 0.126 | | |
| 12 | 16.336 | 1.430 | 1.56732 | 42.84 |
| 13 | 29.850 | 1.504 | | |
| 14 | 15.376 | 1.529 | 1.91082 | 35.25 |
| 15 | 8.622 | 0.010 | 1.51400 | 42.84 |
| 16 | 8.622 | 2.723 | 1.49700 | 81.61 |
| 17 | 42.502 | variable | | |
| 18* | 21.540 | 3.766 | 1.51633 | 64.06 |
| 19* | −27.238 | variable | | |
| 20 | −81.427 | 0.700 | 1.91082 | 35.25 |
| 21 | 9.677 | 2.994 | 1.49700 | 81.61 |
| 22 | 49.690 | 2.212 | | |
| 23* | 74.692 | 2.188 | 1.68893 | 31.08 |
| 24* | −43.698 | variable | | |
| image | infinity | | | |

-continued

Unit: mm

Aspherical Surface Data

| i | K | A4 | A6 | A8 |
|---|---|---|---|---|
| 3 | 0.0000e+000 | 1.4461e−004 | −9.3769e−007 | 3.1344e−009 |
| 4 | 0.0000e+000 | 1.2631e−004 | −5.6614e−007 | −6.8459e−009 |
| 18 | 0.0000e+000 | −3.2174e−005 | −2.0885e−006 | 5.9134e−008 |
| 19 | 0.0000e+000 | 2.3541e−005 | −2.6189e−006 | 5.6720e−008 |
| 23 | 0.0000e+000 | 6.5771e−005 | −2.0583e−007 | 9.0618e−009 |
| 24 | 0.0000e+000 | 5.2237e−005 | −3.8179e−008 | 3.2427e−009 |

Aspherical Surface Data

| i | A10 | A12 | A14 | A16 |
|---|---|---|---|---|
| 3 | −4.1810e−012 | 0.0000e+000 | 0.0000e+000 | 0.0000e+000 |
| 4 | 5.9350e−011 | −1.6255e−013 | 0.0000e+000 | 0.0000e+000 |
| 18 | −9.9951e−010 | 0.0000e+000 | 0.0000e+000 | 0.0000e+000 |
| 19 | −9.4843e−010 | 0.0000e+000 | 0.0000e+000 | 0.0000e+000 |
| 23 | −2.9595e−011 | 0.0000e+000 | 0.0000e+000 | 0.0000e+000 |
| 24 | 2.0012e−011 | 0.0000e+000 | 0.0000e+000 | 0.0000e+000 |

Miscellaneous Data
Zoom Ratio 2.01

| | Wide angle (W) | Middle (M) | Telephoto (T) |
|---|---|---|---|
| Fl | 11.200 | 16.849 | 22.497 |
| Fno. | 3.580 | 4.095 | 4.610 |
| ω | 51.735 | 40.124 | 32.260 |
| y'max | 14.200 | 14.200 | 14.200 |
| TL | 95.237 | 86.347 | 84.494 |
| BF | 14.832 | 19.362 | 23.874 |
| d8 | 22.727 | 9.308 | 2.942 |
| d17 | 5.582 | 4.090 | 2.998 |
| d19 | 2.000 | 3.492 | 4.584 |

Zoom Lens Group Data

| Group | (Surface) | Focal Length |
|---|---|---|
| 1 | (1-8) | −16.601 |
| 2 | (9-17) | 25.190 |
| 3 | (18-19) | 23.924 |
| 4 | (20-24) | −30.533 |

Example 4

Unit: mm

Surface Data

| i | r | d | nd | vd |
|---|---|---|---|---|
| object | infinity | infinity | | |
| 1 | 52.539 | 2.300 | 1.77250 | 49.62 |
| 2 | 17.432 | 5.890 | | |
| 3* | 32.865 | 1.700 | 1.80860 | 40.42 |
| 4* | 15.437 | 10.299 | | |
| 5 | 22.225 | 7.936 | 1.68893 | 31.16 |
| 6 | −35.714 | 0.010 | 1.51400 | 42.84 |
| 7 | −35.714 | 1.300 | 1.83481 | 42.72 |
| 8 | 35.377 | variable | | |
| 9 (stop) | infinity | 2.414 | | |
| 10 | 25.549 | 2.082 | 1.84666 | 23.78 |
| 11 | −874.195 | 3.340 | | |
| 12 | −86.388 | 0.600 | 1.76182 | 26.61 |
| 13 | 37.715 | 0.341 | | |
| 14 | 14.538 | 3.310 | 1.49700 | 81.61 |
| 15 | −20.775 | 1.236 | | |
| 16 | −14.409 | 0.600 | 1.80610 | 33.27 |
| 17 | 24.697 | 0.010 | 1.51400 | 42.84 |
| 18 | 24.697 | 2.164 | 1.49700 | 81.61 |

-continued

Unit: mm

| | | | | |
|---|---|---|---|---|
| 19 | −45.395 | 0.437 | | |
| 20* | 16.778 | 3.697 | 1.58313 | 59.38 |
| 21* | −13.788 | variable | | |
| 22 | 48.031 | 0.700 | 1.80420 | 46.50 |
| 23 | 12.596 | variable | | |
| 24 | 58.376 | 5.040 | 1.76182 | 26.61 |
| 25 | −10.320 | 0.010 | 1.51400 | 42.84 |
| 26 | −10.320 | 0.899 | 1.91082 | 35.25 |
| 27 | 78.612 | variable | | |
| image | infinity | | | |

Aspherical Surface Data

| i | K | A4 | A6 | A8 |
|---|---|---|---|---|
| 3 | 0.0000e+000 | 1.0070e−004 | −5.3091e−007 | 7.4399e−010 |
| 4 | 0.0000e+000 | 9.0554e−005 | −2.9676e−007 | −6.2614e−009 |
| 20 | 0.0000e+000 | −1.2478e−004 | 2.5143e−007 | −5.6810e−009 |
| 21 | 0.0000e+000 | 9.1867e−005 | −7.4947e−008 | −6.1973e−009 |

Aspherical Surface Data

| i | A10 | A12 | A14 | A16 |
|---|---|---|---|---|
| 3 | 3.1551e−012 | −8.8165e−015 | 0.0000e+000 | 0.0000e+000 |
| 4 | 4.7123e−011 | −1.1522e−013 | 0.0000e+000 | 0.0000e+000 |
| 20 | 4.4664e−011 | 0.0000e+000 | 0.0000e+000 | 0.0000e+000 |
| 21 | 8.2420e−011 | 0.0000e+000 | 0.0000e+000 | 0.0000e+000 |

Miscellaneous Data
Zoom Ratio 2.01

| | Wide angle (W) | Middle (M) | Telephoto (T) |
|---|---|---|---|
| Fl | 11.201 | 16.849 | 22.497 |
| Fno. | 3.580 | 4.095 | 4.610 |
| ω | 51.734 | 40.124 | 32.260 |
| y'max | 14.200 | 14.200 | 14.200 |
| TL | 107.647 | 94.814 | 90.443 |
| BF | 14.798 | 18.729 | 22.640 |
| d8 | 29.079 | 12.314 | 4.033 |
| d21 | 1.500 | 2.781 | 3.852 |
| d23 | 5.955 | 4.674 | 3.603 |

Zoom Lens Group Data

| Group | (Surface) | Focal Length |
|---|---|---|
| 1 | (1-8) | −17.918 |
| 2 | (9-21) | 15.774 |
| 3 | (22-23) | −21.418 |
| 4 | (24-27) | −83.369 |

Example 5

Unit: mm

Surface Data

| i | r | d | nd | νd |
|---|---|---|---|---|
| object | infinity | infinity | | |
| 1 | 69.496 | 2.300 | 1.77250 | 49.62 |
| 2 | 18.142 | 5.772 | | |
| 3* | 37.036 | 1.700 | 1.80860 | 40.42 |
| 4* | 16.409 | 10.053 | | |
| 5 | 23.813 | 8.628 | 1.68893 | 31.16 |
| 6 | −50.005 | 1.006 | | |
| 7 | −43.191 | 1.300 | 1.83481 | 42.72 |
| 8 | 46.096 | variable | | |
| 9 (stop) | infinity | 2.236 | | |
| 10 | 20.264 | 4.313 | 1.74077 | 27.76 |
| 11 | −9.259 | 0.010 | 1.51400 | 42.84 |

-continued

Unit: mm

| | | | | |
|---|---|---|---|---|
| 12 | −9.259 | 0.600 | 1.80610 | 33.27 |
| 13 | 32.787 | 0.743 | | |
| 14 | 16.106 | 3.711 | 1.49700 | 81.61 |
| 15 | −14.427 | 0.998 | | |
| 16 | −13.046 | 0.600 | 1.75520 | 27.53 |
| 17 | 29.111 | 0.010 | 1.51400 | 42.84 |
| 18 | 29.111 | 2.226 | 1.49700 | 81.61 |
| 19 | −67.197 | 0.233 | | |
| 20* | 19.629 | 4.021 | 1.58313 | 59.38 |
| 21* | −14.029 | variable | | |
| 22 | 35.149 | 0.700 | 1.80420 | 46.50 |
| 23 | 11.966 | variable | | |
| 24 | 93.067 | 4.938 | 1.76182 | 26.61 |
| 25 | −10.101 | 0.010 | 1.51400 | 42.84 |
| 26 | −10.101 | 0.900 | 1.91082 | 35.25 |
| 27 | 88.389 | variable | | |
| image | infinity | | | |

Aspherical Surface Data

| i | K | A4 | A6 | A8 |
|---|---|---|---|---|
| 3 | 0.0000e+000 | 9.2540e−005 | −3.2062e−007 | −2.3017e−010 |
| 4 | 0.0000e+000 | 7.9203e−005 | −6.0332e−008 | −5.6795e−009 |
| 20 | 0.0000e+000 | −1.2127e−004 | −1.8754e−007 | 5.2217e−010 |
| 21 | 0.0000e+000 | 7.6251e−005 | −4.9484e−007 | 2.3225e−009 |

Aspherical Surface Data

| i | A10 | A12 | A14 | A16 |
|---|---|---|---|---|
| 3 | 4.3215e−012 | −7.6867e−015 | 0.0000e+000 | 0.0000e+000 |
| 4 | 3.2575e−011 | −6.5361e−014 | 0.0000e+000 | 0.0000e+000 |
| 20 | −1.8724e−010 | 0.0000e+000 | 0.0000e+000 | 0.0000e+000 |
| 21 | −1.6792e−010 | 0.0000e+000 | 0.0000e+000 | 0.0000e+000 |

Miscellaneous Data
Zoom Ratio 2.01

| | Wide angle (W) | Middle (M) | Telephoto (T) |
|---|---|---|---|
| Fl | 11.201 | 16.849 | 22.496 |
| Fno. | 3.580 | 4.095 | 4.610 |
| ω | 51.733 | 40.124 | 32.261 |
| y'max | 14.200 | 14.200 | 14.200 |
| TL | 108.530 | 95.040 | 90.489 |
| BF | 14.771 | 18.371 | 22.108 |
| d8 | 29.163 | 12.072 | 3.783 |
| d21 | 1.500 | 2.842 | 3.919 |
| d23 | 6.089 | 4.747 | 3.670 |

Zoom Lens Group Data

| Group | (Surface) | Focal Length |
|---|---|---|
| 1 | (1-8) | −18.325 |
| 2 | (9-21) | 15.272 |
| 3 | (22-23) | −22.868 |
| 4 | (24-27) | −61.293 |

TABLE 1

| Conditional formula corresponding values | | Example 1 | Example 2 | Example 3 | Example 4 | Example 5 |
|---|---|---|---|---|---|---|
| Optical power arrangement | | Negative-positive-negative-negative | Negative-positive-negative-positive | Negative-positive-positive-negative | Negative-positive-negative-negative | Negative-positive-negative-negative |
| (1) | T1/Lmax | 0.085 | 0.073 | 0.102 | 0.096 | 0.093 |
| (2) | f1F/f1R | −0.1622 | −0.2190 | −0.1448 | −0.1287 | −0.1685 |
| (3) | \|νp − νn\| | 15.8 | 23.4 | 48.3 | 11.6 | 11.6 |
| (4) | f4/f3 | 2.539 | — | — | 3.892 | 2.680 |
| (5) | \|ν4p − ν4n\| | 9.529 | — | — | 8.641 | 8.641 |
| (1A) | R1/ωw | 0.420 | 0.407 | 0.415 | 0.415 | 0.434 |

What is claimed is:

1. A zoom lens that performs zooming by moving a plurality of lens groups along an optical axis to change a distance between the plurality of lens groups, wherein at least a first group of negative optical power and a second group of positive optical power are included between an object to be imaged by the zoom lens, and an image surface, when zooming is performed from a wide-angle end to a telephoto end, a distance between the first group and the second group is reduced, and an aperture is moved together with the second group, the first group is formed, from an object side of the second group, with a front group comprising only negative lenses and a rear group comprising two lenses, a positive lens and a negative lens, from the object side of the second group, and which has a positive optical power as a whole and conditional formula (1) below is satisfied:

$$0.06 < T1/Lmax < 0.11 \quad (1)$$

where

T1 is a distance on an optical axis between the front group and the rear group in the first group, and Lmax is a maximum total length of the zoom lens in zooming.

2. The zoom lens of claim 1, wherein conditional formula (2) below is satisfied:

$$-0.25 < f1F/f1R < -0.10 \quad (2)$$

where f1F is a focal length of the front group in the first group, and f1R is a focal length of the rear group in the first group.

3. The zoom lens of claim 1, wherein at least one aspherical surface is included within the front group in the first group.

4. The zoom lens of claim 1, wherein the front group in the first group comprises two or less negative lenses.

5. The zoom lens of claim 1, wherein conditional formula (3) below is satisfied:

$$5 < |\nu p - \nu n| < 50 \quad (3)$$

where

νp is an Abbe number indicating dispersion of the positive lens within the rear group in the first group, and νn is an Abbe number indicating dispersion of the negative lens within the rear group in the first group.

6. The zoom lens of claim 1, wherein the rear group in the first group is formed with one cemented lens.

7. The zoom lens of claim 1, wherein the zoom lens is a four-component zoom lens that includes, from an object side of the image surface, the first group of negative optical power, the second group of positive optical power, a third group of negative optical power and a fourth group of negative optical power.

8. The zoom lens of claim 7, wherein when zooming is performed from the wide-angle end to the telephoto end, a distance between the second group and the third group is increased, and a distance between the third group and the fourth group is reduced.

9. The zoom lens of claim 7, wherein conditional formula (4) below is satisfied:

$$2 < f4/f3 < 4 \quad (4)$$

where f4 is a focal length of the fourth group, and f3 is a focal length of the third group.

10. The zoom lens of claim 7, wherein the fourth group is formed with one cemented lens.

11. The zoom lens of claim 7, wherein the fourth group comprises a positive lens and a negative lens, and conditional formula (5) below is satisfied:

$$5 < |\nu 4p - \nu 4n| < 50 \quad (5)$$

where

ν4p is an Abbe number indicating dispersion of the positive lens within the fourth group, and ν4n is an Abbe number indicating dispersion of the negative lens within the fourth group.

12. The zoom lens of claim 7, wherein the fourth group is formed with a cemented lens that comprises a positive lens and a negative lens from the object side of the image surface.

13. The zoom lens of claim 7, wherein the third group is formed with a negative single lens.

14. An image sensing optical device comprising:

a zoom lens that performs zooming by moving a plurality of lens groups along an optical axis to change a distance between the plurality of lens groups, wherein at least a first group of negative optical power and a second group of positive optical power are included between an object to be imaged by the zoom lens and an image surface, when zooming is performed from a wide-angle end to a telephoto end, a distance between the first group and the second group is reduced, and an aperture is moved together with the second group, the first group is formed, from an object side of the second group, with a front group comprising only negative lenses and a rear group comprising two lenses, a positive lens and a negative lens, from the object side of the second group, and which has a positive optical power as a whole, and conditional formula (1) below is satisfied:

$$0.06 < T1/Lmax < 0.11 \quad (1)$$

where
- T1 is a distance on an optical axis between the front group and the rear group in the first group, and
- Lmax is a maximum total length of the zoom lens in zooming; and an image sensing element that converts an optical image formed on a light receiving surface into an electrical signal, wherein the zoom lens is provided such that an optical image of a subject is formed on the light receiving surface of the image sensing element.

15. A digital appliance comprising:

an image sensing optical device comprising a zoom lens that performs zooming by moving a plurality of lens groups along an optical axis change a distance between the plurality of lens groups, wherein at least a first group of negative optical power and a second group of positive optical power are included between an object to be imaged by the zoom lens and an image surface, when zooming is performed from a wide-angle end to a telephoto end, a distance between the first group and the second group is reduced, and an aperture is moved together with the second group, the first group is formed, from an object side, with a front group comprising only negative lenses and a rear group comprising two lenses, a positive lens and a negative lens, from the object side of the second group, and which has a positive optical power as a whole, and conditional formula (1) below is satisfied:

$$0.06 < T1/Lmax < 0.11 \tag{1}$$

where
- T1 is a distance on an optical axis between the front group and the rear group in the first group, and
- Lmax is a maximum total length of the zoom lens in zooming;

an image sensing element that converts an optical image formed on a light receiving surface into an electrical signal, wherein the zoom lens is provided such that an optical image of a subject is formed on the light receiving surface of the image sensing element; and a control section that controls at least one of a function of shooting a still image of the subject and a function of shooting a moving image of the subject by the image sensing optical device.

* * * * *